United States Patent
Li

(10) Patent No.: US 12,124,261 B2
(45) Date of Patent: Oct. 22, 2024

(54) SYSTEMS AND METHODS FOR OPTIMIZING ROUTE PLANS IN AN OPERATING ENVIRONMENT

(71) Applicant: Rapyuta Robotics Co., Ltd., Tokyo (JP)

(72) Inventor: Wen Zheng Li, Tokyo (JP)

(73) Assignee: Rapyuta Robotics Co., Ltd., Tokyo (JP)

( * ) Notice: Subject to any disclaimer, the term of this patent is extended or adjusted under 35 U.S.C. 154(b) by 156 days.

(21) Appl. No.: 16/953,415

(22) Filed: Nov. 20, 2020

(65) Prior Publication Data

US 2022/0163969 A1 May 26, 2022

(51) Int. Cl.
*G05D 1/02* (2020.01)
*G01C 21/34* (2006.01)
*G05D 1/00* (2024.01)

(52) U.S. Cl.
CPC ....... *G05D 1/0214* (2013.01); *G01C 21/3484* (2013.01); *G01C 21/3492* (2013.01); *G05D 1/0088* (2013.01); *G05D 1/0291* (2013.01)

(58) Field of Classification Search
None
See application file for complete search history.

(56) References Cited

U.S. PATENT DOCUMENTS

| | | | |
|---|---|---|---|
| 2014/0032035 A1 | 1/2014 | Thomson | |
| 2014/0100717 A1 | 4/2014 | Yoneda | |
| 2014/0324267 A1 | 10/2014 | Pfaff et al. | |
| 2017/0309172 A1* | 10/2017 | Linder | G08G 1/0133 |
| 2018/0107223 A1* | 4/2018 | Zhong | G01C 21/343 |
| 2019/0217857 A1* | 7/2019 | Sorin | B60W 60/0023 |
| 2020/0097022 A1 | 3/2020 | Miki et al. | |

(Continued)

FOREIGN PATENT DOCUMENTS

| | | | |
|---|---|---|---|
| CN | 111220157 A | * | 6/2020 |
| CN | 111366147 A | * | 7/2020 |

(Continued)

OTHER PUBLICATIONS

Machine translation of CN-111366147-A (Year: 2020).*

(Continued)

*Primary Examiner* — Amelia Vorce
*Assistant Examiner* — Kyle S Park
(74) *Attorney, Agent, or Firm* — Trupti P. Joshi

(57) ABSTRACT

A system and a method to optimize route plans for handling critical scenarios faced in an operating environment have been described. The system or a platform resolves one or more nodes based on the inputs related to an operating environment. The system plans one or more routes based on the resolved nodes to provide generated route plans. Based on the planning, the system may analyze one or more route plans for critical scenarios, for example, avoiding a collision or minimizing congestion, damage to the robot, performance of vehicle or warehouse, etc. After the route plans are analyzed, the system optimizes one or more route plans to provide optimized route plans. The optimized route plans are distributed to one or more autonomous vehicles. The fleet of autonomous vehicles may then route progress messages and share feedback with the platform.

20 Claims, 10 Drawing Sheets

(56) References Cited

U.S. PATENT DOCUMENTS

2020/0293063 A1* 9/2020 Aisu .................... G05D 1/0088
2020/0377085 A1* 12/2020 Floyd-Jones ..... B60W 30/0956
2022/0083076 A1 3/2022 Maeda

FOREIGN PATENT DOCUMENTS

| EP | 1835370 A2 * | 9/2007 | ............ G05D 1/101 |
| JP | 2005242489 A | 9/2005 | |
| JP | 2020-135595 A1 | 8/2020 | |
| KR | 20150115069 A * | 10/2015 | |
| WO | WO-2015011661 A9 * | 8/2015 | ........... G05D 1/0297 |
| WO | WO 2020/117958 A1 | 6/2020 | |
| WO | WO-2020139327 A1 * | 7/2020 | ............ B60W 50/04 |
| WO | WO2020144970 A1 | 7/2020 | |
| WO | WO2020147621 A1 | 7/2020 | |

OTHER PUBLICATIONS

Machine translation of EP-1835370-A2 (Year: 2007).*
Machine translation of CN-111220157-A (Year: 2020).*
Description of WO-2015011661-A9 (Year: 2015).*
Machine translation of KR-20150115069-A (Year: 2015).*
Search report mailed on Jul. 19, 2021, in the EP Application No. 21165916.4.
Search opinion mailed on Jul. 30, 2021, in the EP Application No. 21165916.4.

* cited by examiner

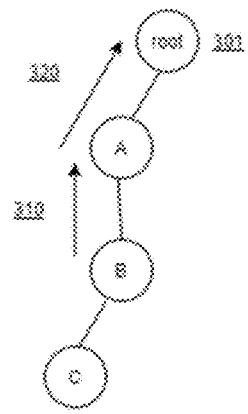
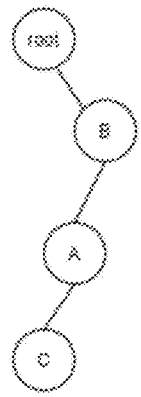
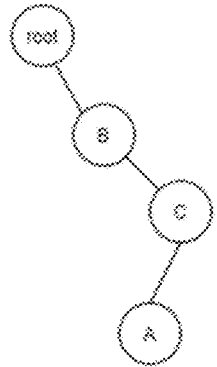
FIG. 3(A)
FIG. 3(B)
FIG. 3(C)
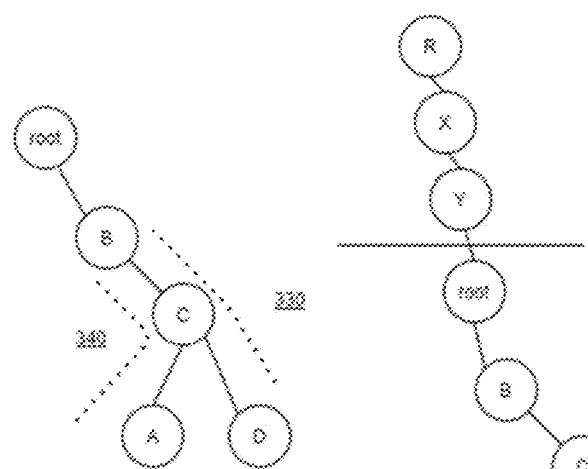
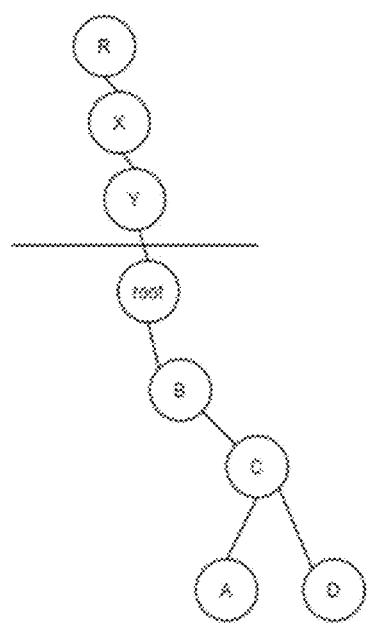
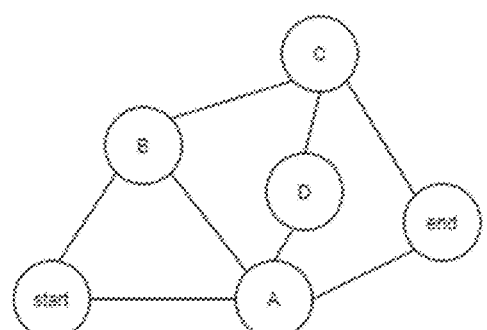
FIG. 3(D)
FIG. 3(E)
FIG. 3(F)

SYSTEMS AND METHODS FOR OPTIMIZING ROUTE PLANS IN AN OPERATING ENVIRONMENT

TECHNICAL FIELD

This invention is generally related to route planning and more particularly associated with optimizing route plans for handling critical scenarios faced in an operating environment, for example, collisions, minimizing congestion, safety hazards, improving performance (e.g., utilization, productivity, efficiency of autonomous vehicles, warehouse management tools), etc.

BACKGROUND

Planning routes for large numbers of robots in a small confined space, particularly where multiple autonomous mobile robots can fit through space at a time, have not received industrial recognition. Robotics solution providers tried to handle similar problems by designing robots to force the robots to follow certain lines, predictably moving the robots, assuming nothing is around them. For such systems, there is not much need for route planning. Further, such systems cannot be scaled and do not integrate with existing warehouse designs. Such systems face problems wherein re-planning routes becomes cumbersome, reconfiguring is challenging at the infrastructure level, and no obstacles can interfere with them.

Whenever new robots are added to such or any other systems, the input space blows exponentially; hence, the existing systems have not kept up with the scale of increase in robots. This scenario leads to a combinatorial problem, and it becomes difficult for the system to match as robots are scaled up. This problem can be related to any type of autonomous vehicles.

SUMMARY

The following is a summary of the subject matter that is described in greater detail herein. This summary is not intended to be limiting as to the scope of the claims. These and other features of the invention will be more readily understood upon consideration of the attached drawings and the following detailed description of those drawings and the presently-preferred and other embodiments of the invention.

Described herein are various technologies pertaining to optimizing route plans. The system comprises a cloud platform that includes a multi-robot route planner. The multi-robot planner comprises a node resolver that resolves one or more nodes based on inputs related to an operating environment, like a warehouse, construction site, or a hospital. The nodes may be considered as regions of space in the operating environment. The multi-robot planner comprises multiple modules that plan one or more routes for navigation based on the resolved nodes. The modules may analyze one or more route plans for critical decision-making scenarios, for example, avoiding collisions or minimizing congestions. After the modules analyze the route plans, the system utilizes the multi-robot route planner to optimize route plans based on the analysis. The optimized route plans are distributed to one or more autonomous vehicles.

The technologies described herein are related to a robust cloud platform that optimizes route plans. In an exemplary embodiment, the platform utilizes multiple data structures to represent the operating environment, generates route plans, and allows optimized movement of the vehicles from one node to another node. The platform provides various techniques for analyzing the one or more generated route plans for critical scenarios, like collisions. While analyzing one or more generated route plans, the platform may apply heuristics, cost functions, metrics, etc. to identify new route plans that may avoid collisions. In an exemplary embodiment, while analyzing the one or more generated route plans, the platform may dynamically create duplicate nodes when determining that one of the route plans between nodes may lead to a collision. The created duplicate nodes may be used by the platform to generate an alternate route plan to avoid a collision or use cost functions to generate a better route plan.

In an exemplary embodiment, the system or cloud platform may utilize one or more or combination of multiple techniques or data comprising speed scaling, upsampling, passive paths, parkable nodes, non-overlapping nodes, priority metrics, time penalty, etc. for analyzing and optimizing the route plans for one or more collisions. The system may then distribute the optimized route plans to one or more autonomous vehicles.

The above summary presents a simplified summary to provide a basic understanding of some aspects of the systems and/or methods discussed herein. This summary is not an extensive overview of the systems and/or methods discussed herein. It is not intended to limit the scope of the claims or is not intended to identify key/critical elements or to delineate the scope of such systems and/or methods. Its sole purpose is to present some concepts in a simplified form as a prelude to the more detailed description presented later.

BRIEF DESCRIPTION OF THE DRAWINGS

The specific features, aspects, and advantages described herein will become better understood with regard to the following description, appended claims, and accompanying drawings where:

FIGS. 3(A)-3(E), each represent an exemplary non-limiting representation for optimizing route plans, according to an embodiment;

FIG. 3(F) is an exemplary non-limiting representation of a graph illustrating generating optimized route plans between various nodes in an operating environment, according to an embodiment;

Figure 1:
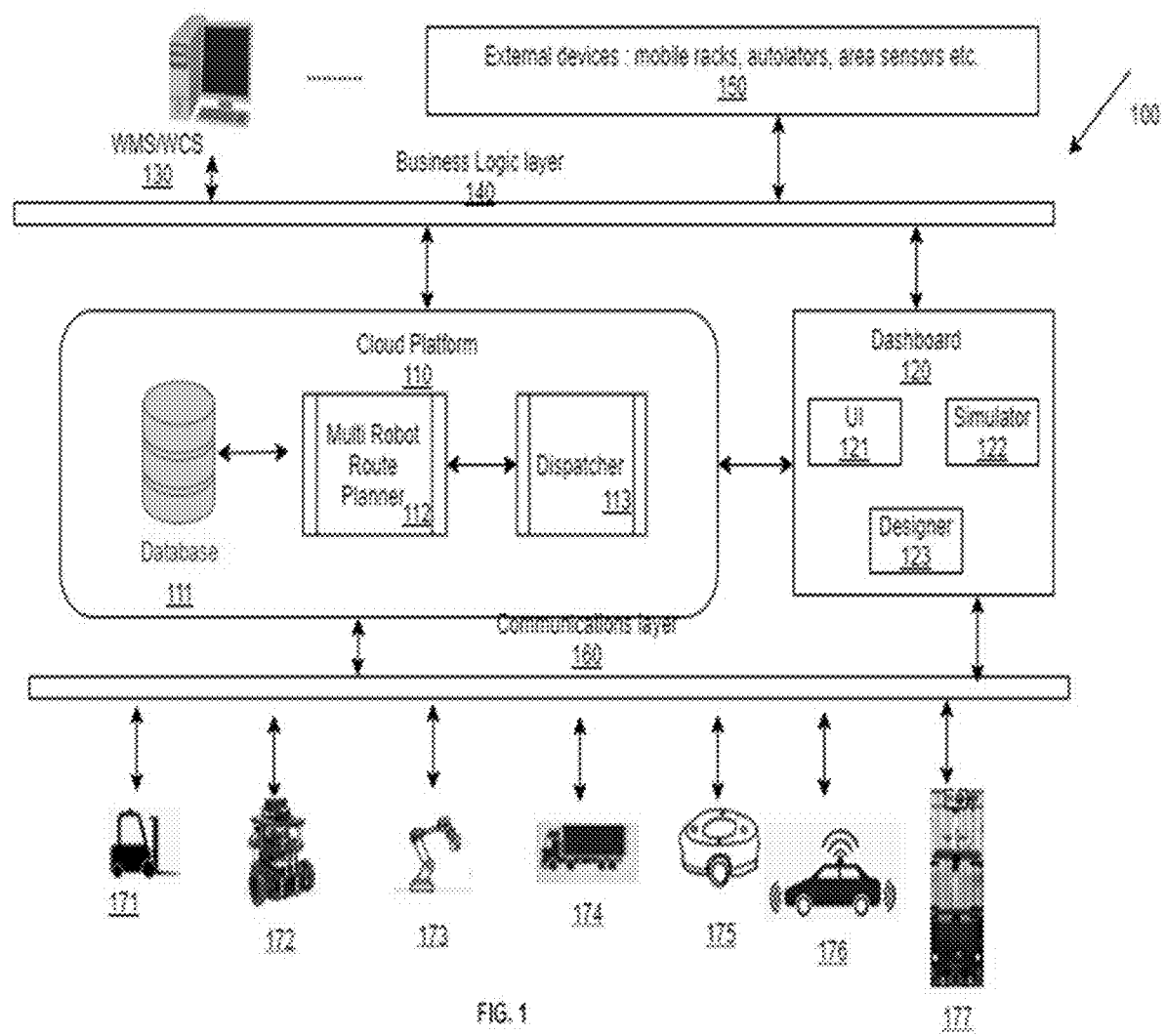
FIG. 1 is a block diagram illustrating a computer-implemented system for optimizing route plans for autonomous vehicles, according to an embodiment.

Although the specific features of the present invention are shown in some drawings and not in others, this is done for convenience only as each feature may be combined with any or all of the other features in accordance with the present invention. The ordering of blocks or components in the drawings are not restrictive and can be interchanged in any order in accordance with the present invention. The above figures present a basic understanding of some aspects of the systems and/or methods discussed herein. The drawings are not an extensive overview of the systems and/or methods discussed herein. It is not intended to identify key/critical elements or to delineate the scope of such systems and/or methods. Its sole purpose is to present some concepts in a simplified form as a prelude to the more detailed description presented later.

DETAILED DESCRIPTION

Embodiments of techniques to provide a platform for optimizing route plans for autonomous vehicles are described herein. Reference throughout this specification to "one embodiment", "this embodiment" and similar phrases, means that a particular feature, structure, or characteristic described in connection with the embodiment is included in at least one of the one or more embodiments. Thus, the appearances of these phrases in various places throughout this specification are not necessarily all referring to the same embodiment. Furthermore, the particular features, structures, or characteristics may be combined in any suitable manner in one or more embodiments.

Any combination of one or more computer-readable media may be utilized. The computer-readable media may be a computer-readable signal medium or a computer-readable storage medium. A computer-readable storage medium may be, for example, but not limited to, an electronic, magnetic, optical, electromagnetic, or semiconductor system, apparatus, or device, or any suitable combination of the foregoing. All systems and processes discussed herein may be embodied in program code read from one or more non-transitory computer-readable media. More specific examples (a non-exhaustive list) of the computer-readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device. In some embodiments, hard-wired circuitry may be used in place of, or in combination with, program code for implementation of processes according to some embodiments. Embodiments are therefore not limited to any specific combination of hardware and software.

A computer-readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium that can communicate, propagate, or transport a program for use by or in connection with an instruction execution system, apparatus, or device. Program code embodied on a computer-readable signal medium may be transmitted using any appropriate medium, including but not limited to wireless, wireline, optical fiber cable, RF, or any suitable combination of the foregoing.

Computer program code for carrying out operations for aspects of the present disclosure may be written in any combination of one or more programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS), Platform as a Service (PaaS) or Infrastructure as a Service (IaaS) or Robotics as a Service (RaaS) or Warehouse as a Service (WaaS) or Collaborative robots (cobots) as a Service or other service models. The communication may extend to both wired and wireless communication.

Aspects of the present disclosure are described herein with reference to flowchart illustrations and/or block diagrams of methods, apparatuses (systems), and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

These computer program instructions may also be stored in a computer-readable medium that when executed can direct a computer, other programmable data processing apparatus, or other devices to function in a particular manner, such that the instructions when stored in the computer-readable medium produce an article of manufacture including instructions which when executed, cause a computer to implement the function/act specified in the flowchart and/or block diagram block or blocks. The computer program instructions may also be loaded onto a computer, other programmable instruction execution apparatus or other devices to cause a series of operational steps to be performed on the computer, other programmable apparatuses or other devices to produce a computer-implemented process such that the instructions which execute on one or more computers or other programmable apparatus provide processes for implementing the functions/acts specified in the flowchart and/or block diagram block or blocks.

As will be appreciated by one skilled in the art, aspects of the present disclosure may be illustrated and described herein in any of a number of patentable classes or contexts including any new and useful process, machine, manufacture, or composition of matter, or any new and useful improvement thereof. Accordingly, aspects of the present disclosure may be implemented as entirely hardware, entirely software (including firmware, resident software, micro-code, or other suitable types of software) or combining software and hardware implementation that may all generally be referred to herein as a "circuit," "module," "component," or "system" or "platform" or "apparatus". Furthermore, aspects of the present disclosure may take the form of a computer program product embodied in one or more computer-readable media (e.g., tangible, non-transitory computer-readable media) having computer readable program code embodied thereon. The present disclosure refers to terms like 'users', 'developers', 'designer', 'third parties', 'warehouse owner', 'robotics solutions provider' etc. and is used in several or specific embodiments, however, the terms are not restricted to those specific embodiments and can be replaced by other term(s) as the invention is not restricted or limited by these terms.

A device is an object or a physical entity having a unique identifier and the ability to transfer data over the internet. In one embodiment, the device is a 'thing' in the Internet of Things (IoT). A thing, in the IoT context, refers to an entity or physical object that has a unique identifier, an embedded system, and the ability to transfer data over a network. These devices may include physical devices, home appliances, vehicles, edge devices, fog devices, etc. The device also includes robots that can perform actuation and sensing along with other device functionalities.

It is understood that the present invention refers to various terms that are interchangeable and may be used in one or more embodiments interchangeably. For example, the term 'nodes' may be interchanged by 'junctions' or 'tree element' or 'graph element' without any change in the scope or implementation of the invention. Such interchange may not be considered limiting and such interchange are considered within the scope of the invention. In one embodiment, it is understood that an autonomous vehicle may be referred to as a node in the operating environment, such that the autonomous vehicle may be one or more of parked at the node, waiting at the node, traveling via the node, stopped at the node, completed navigation at the node, etc. It is also understood that the terms 'route', 'route plan,' 'trajectory', 'travel plan', 'navigation plan,' etc. may indicate the same term and are used at different places as per the use case scenarios. It is understood that the execution of one or more process steps leads to an output which is a result of the execution of the process step. For example, the process step of planning one or more route plans based on the resolved nodes in the operating environment may lead to an output at least of one or more generated route plans. The process step of optimizing the generated route plans based on the analysis may lead to an output, at least resulting in the generation of optimized route plans. Similarly, the process step of prioritizing a route plan from the generated route plans based on the identified priority value of the first autonomous vehicle may lead to an output of at least one or more prioritized route plans.

FIG. 1 is a block diagram illustrating a computer-implemented system for optimizing route plans for autonomous vehicles, according to an embodiment. In one embodiment, the objective of system 100 is to apply a best-effort approach to minimize the collisions and take steps to avoid the collisions, wherever possible. The system 100 may comprise one or more processing devices and storage devices that include computer-readable instructions executed by processing devices for optimizing route plans. The system 100 comprises a Cloud platform 110 that may be considered on-demand availability of computer system resources with/without the user's direct active management. The Cloud platform includes one or more processors and memory to generate and store the route plans or trajectories. In one embodiment, the cloud platform 110 includes a Database 111 for storing the route plans or trajectories and related data for generating the route plans, as discussed herewith. In one embodiment, the related data may be autonomous vehicle state information, statistics, other information related to navigation, traversing trees or graphs, preconditions, route tables, etc. The cloud platform 110 includes a multi-robot route planner (mrrp) 112, which includes one or more processors and memory to perform the primary task related to optimizing route plans for avoiding collisions. In one embodiment, the mrrp 112 may act as a server, a system, an equivalent device, software, or a hardware component, for performing various tasks related to route planning. The mrrp 112 has been shown as a module of Cloud platform 110 for representation and simplicity purposes. However, mrrp 112 may act as a component of any other system or platform involved in the tasks related to route planning. The Cloud platform 110 includes a dispatcher 113 whose primary function is task assignment and decides which autonomous vehicle or autonomous device should perform specific tasks and at a particular time. The dispatcher module communicates the details related to the task on the communications layer 160 to one or more autonomous devices that know the destination and the task to be performed at the given time. The autonomous device is then programmed to interact with the mrrp 112, via the communications layer 160. The system 100 also includes a Dashboard 120 that may be used for receiving inputs, like obstacle maps, graphs, tree structures, any other relevant inputs, and for displaying maps, representations like graphs, trees, simulated environments, etc. The Dashboard 120 may include UI 121, simulator 122, and a designer 123 for various functions related to multi-robot route planning and other tasks related to autonomous vehicle functions, like instructing the autonomous vehicle to move from one location to another on a map or a UI, etc. The UI 121 may be used to receive obstacle maps or other inputs related to route planning. Simulator 122 provides a simulation environment that includes a map to represent the autonomous devices' navigation path in an operating environment. The operating environment may include a warehouse, hospitals, construction sites, offices, dockyards, shipyards, roads, rails, etc. The simulator 122 may also be used to instruct the autonomous devices to perform certain tasks to optimize route plans for collision avoidance. One of the instructions may include providing priorities or parameters that may impact one vehicle's navigation over another, etc. The designer 123 may provide a design environment to edit the inputs, like obstacle maps and provide customized status information, for example, inputs like the potential for dynamic collisions at a particular time, for example, the arrival of certain autonomous devices, like driverless cars, at a traffic junction at a particular time or day based on traffic conditions at the particular time or day. The inputs or instructions may be provided by any component of Dashboard 120 or other components of system 100, for example, Warehouse management system (WMS)/Warehouse Control System (WCS) 130. The WMS or WCS 130 may be handled by a Warehouse manager/operator and other components of the system 100 may either be operatively coupled or embedded within WMS/WCS 130. In one embodiment, WMS or WCS 130 may be configured to interface with components of Cloud Platform 110 for coordinating with autonomous vehicles and generating multi-robot route plans. The coupling of various external or internal components may be via Business Logic Layer 140 or Communications Layer 160 or by any other non-limiting means of communications. The system supports similar or heterogeneous autonomous vehicles like automated forklift 171, turtle robot 172, arms 173, automated trucks 174, picking robots 175, driverless cars 176, Assignee's Pick assist Autonomous Mobile robot (AMR) 177, etc. The Business Logic Layer 140 may be customized to allow customers or other stakeholders to integrate their robotics software or hardware for customized robotics solutions. The system 100 includes External devices 150 like mobile racks, autolators, area sensors, etc.

Generally, when an autonomous vehicle X has to travel from source node A to destination node B, the solution may require another autonomous vehicle Y to give way to the autonomous vehicle X to reach destination B. Such scenarios are not decoupled. To achieve a solution for autonomous vehicle X, the autonomous vehicle Y has to give way, and hence, because of this dependency, the problem is not decoupled. The situation gets further amplified when such dependency scales for other vehicles that are navigating the operating environment. However, the system uses an approach that avoids a decoupled problem using an effect where other autonomous vehicles yield vehicle X. The computation is handled by localizing the problem to vehicle X or individual autonomous vehicles.

In some scenarios, the aisle in a warehouse may be too narrow or has constrained space. Instead of indicating that there is no way the autonomous mobile device can navigate through the aisle due to the constrained space, the system uses a novel and a different approach where the output is always the best effort and provides a solution.

In one embodiment, one of the approaches to the route planning problem may be a collision minimization problem rather than a satisfactory solution. The system minimizes the collision and travel time, and instead of considering collision as a constraint, consider collision as a parameter while designing the solution. In such scenarios, the output route plan may have collisions. The system considers the outputs having collisions as a valid output. This solution may appear trivial for limited autonomous vehicles. However, as the system scales with additional autonomous vehicles and with each vehicle's decision depending on the other's route plan, the overall input space and decision-making increase exponentially. The scenario then becomes a higher-level problem to minimize the overall collisions. The system then provides an output for every scenario on a best-effort basis.

There may be scenarios where things may not go as per the plan of a warehouse entity (for example, warehouse manager). In one embodiment, consider a robot as an autonomous vehicle. For example, the things that may not go as per the plan may be a breakdown of the robot, dynamic obstacles, robots slowing down, inaccurate characterization of the robot's properties, incorrect estimation of robot's speed, whether one or more robots can fit in certain places or if the space is too small or constrained for the robots to navigate, etc. The system may provide metastrategies to solve the aforementioned scenarios. For example, suppose there is an impossible scenario, like a blockage due to multiple robots assembling at a particular zone. In that case, the system may move some of the robots from that zone to other warehouse areas. The moved robots may not complete the task at a specific moment in time. However, the system's decision making solves the problem related to the impossible scenario (blockage due to multiple robots) and generates a best-effort solution.

A message is a data structure comprising typed fields. Each message has a message type that can be, for example, integer, floating-point, boolean, etc. The system and autonomous vehicles may use any of the communication mechanisms for receiving or sending messages. For example, the communication mechanism may be a publisher-supplier communication mechanism or a request-reply communication mechanism for sending and receiving messages from the cloud platform to the autonomous vehicle. ROS (Robot operating system) provides three communication mechanisms: topic (publisher-subscriber communication mechanism), service (request-reply communication mechanism), and action (goal, feedback, result from communication module) that can be used to send or receive messages. Each communication mechanism is used to send a message. It is tied to the message type of the message sent over the communication mechanism, and a receiver can receive messages corresponding to only that message type. For example, when a sender is publishing a name message of type "string" at a "robot name" topic, then a subscriber subscribing to the "robot name" topic can only receive messages of type "string."

There are multiple scenarios where the present invention may be applied. One of the major areas where the invention may be applicable may be in route planning in any kind of dynamic or static environment for any heterogeneous autonomous vehicle, like the assignee's Autonomous mobile robot named 'Sootballs' or automated forklifts or autonomous automobiles or driverless cars, etc. Other areas where the invention may be applied may include multiple robots navigating in an operating environment. The robots that are navigating may broadcast their route details which may be used by the system to plan around the routes. So, the system enables a hybrid mode of execution in which a robot at an execution stage, navigating in an operating environment, like a warehouse, provides the route related details to the system, which may be at a planning stage for some of the other robots that are yet to start the navigation process. The new planned routes may then be shared with other robots to make optimal use of the various modules of the system and recalculate better routes with new route related details received by the navigating robots. The system may also be customized based on multiple factors, for example, how dynamic the operating environment is, etc. The invention is not limiting or restricted to mobile robots, for example, devices like link manipulators may also function in the operating environment with other autonomous vehicles. Two arms of the link manipulators, while performing multiple different tasks, may need to be ensured that the arms don't collide with each other while performing the functions. The invention is non-limiting and generic in nature and may not be restricted to robots, but maybe applicable in environments where collisions need to be avoided in one or more trajectories. The system may be customized where collisions may be re-defined, for example, there may be environments where exact calculations and a high degree of accuracy may be required to achieve navigation.

The system has been described based on 2D environments, however, this is not a limitation, and the system may be extended to 3D environments. The changes that may be required within the system include the distance calculation which may have an additional dimension, Z-axis. Since the focus of the data structures has been on nodes rather than on geometric dimensions, the present invention is generic and non-limiting in nature and may include the additional dimensions without any significant changes other than including the additional dimension related information.

Figure 2:
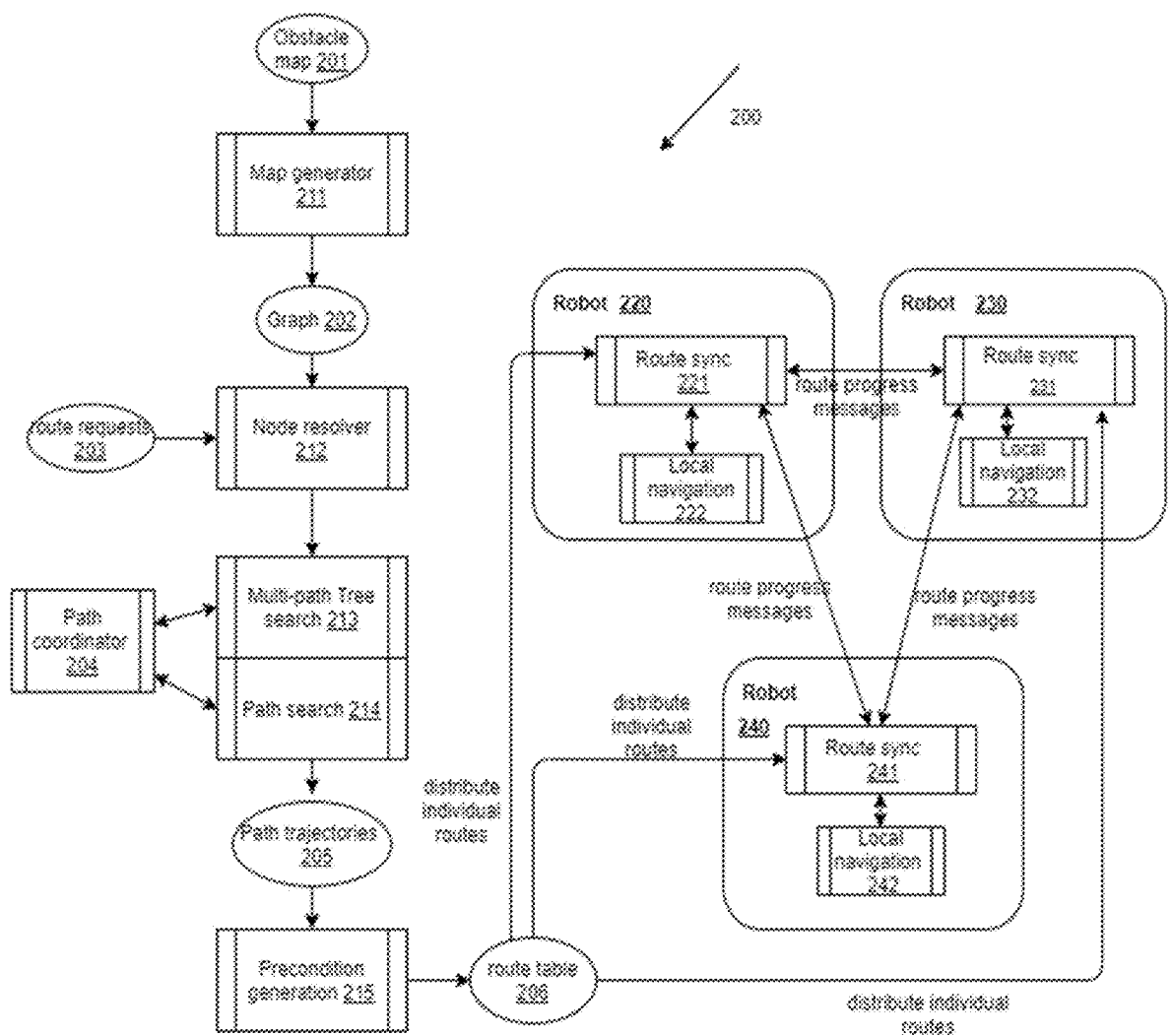
FIG. 2 is a block diagram illustrating components and process steps for distributing optimized route plans, according to an embodiment.

FIG. 2 is a block diagram illustrating components and process steps for distributing optimized route plans, according to an embodiment. The fleet of heterogeneous autonomous vehicles may include robots or vacuum cleaners. In one embodiment, an operating environment may be a warehouse. An obstacle map 201 is a map of a warehouse imported from database 111 or any of the components from Dashboard 120. An obstacle map is a map including details of various obstacles and free spaces in a particular area. For example, in a warehouse, an obstacle map may include the details of racks, pathways, walls, etc. within the warehouse. The obstacle map 201 may be converted into a picture or image to process the obstacle map image. In one embodiment, an obstacle map metadata, including the details of the obstacles included in the obstacle map, is generated along with the image. In FIG. 2, the circle represents the data, and the boxes represent the processes. The data may be an input, output, or data passed around in the flow, while boxes may implement steps involved to perform specific tasks. The initial step is to know the layout of the warehouse. This can be achieved in at least two forms: a) CAD drawing—This is similar to designs of a building providing the blueprint representing the various representations of the building that includes positions of the walls, slabs, columns, etc. Similarly, the obstacle map is a map of the warehouse that includes the static obstacles in the warehouse and is a resultant of driving the robot, scanning the warehouse, using the robot's laser scanners. The output may be multiple laser scans that the designer 123 can piece together to obtain a bitmap image. The bitmap image gives information related to location, presence, or absence of obstacles. The designer 123 is a software module used to remove spurious noise from the laser scans. This cleaning step helps outline the different zones in the warehouse and get details related to location, size, etc. of static obstacles in the warehouse. Since this stage is an initial planning process, the focus is always on static obstacles. The system may not handle dynamic obstacles (e.g., a person suddenly appearing in the robot's path) at the initial planning stage. Although, if such information is available at the initial planning stage, then, the information may also be considered while developing the obstacle map. The obstacle map 201 is then passed onto a map generator module 211. The map generator module 211 receives the obstacle map 201 as an input and converts into a discretized form, such as a graph. The graph includes multiple nodes representing a region of free space. Every edge connecting the nodes represents a pathway with a certain amount of space that robots can move through. This primary representation of the functional space helps in faster traversal and simplifies the overall methodology. In the graph, the edges also have space constraints indicating the width or narrowness of the paths. The assumption is if the robot is too big or large to move through the pathway, then the planning process may consider that the robot cannot move through it. Alternatively, in the planning stage, if a path is big enough for multiple robots to pass through it simultaneously, the information enables the system to not consider the scenario as a collision.

In one embodiment, the generated graph 202 is now delivered to the node resolver module 212. To understand a node resolver module, one needs to understand that the graph includes nodes and the nodes are discrete points in space. However, the requests for the robots are not discrete, but in the continuum (x, y coordinates). The route planner works only if the robots start from a node and end on a node, but it will be difficult if the robot starts in between nodes and ends in between nodes. So, the role of a node resolver is to bridge the gap in case of inconsistent or invalid inputs. The node resolver module performs the step of continuous to discrete mapping, identifying which robot starts at which node. The system finds multiple ways for the node resolver module to resolve the positioning scenarios of the nodes. The easiest and the general solution that works in most of the cases is to associate a node that is closest to the current location of the robot on the basis of the Euclidean or Pythagorean theorem kind of distance. However, in some cases, this solution may not work, for example, consider a simple scenario of a corridor with no exits and being narrow with space for only one robot to pass through. The corridor may include one row of multiple nodes. Now, consider there is a robot that is at a position on the left side of the node while another robot is at a position on the right side of the node. So, if the closest distance solution is applied, then, both the robots may be mapped to the same node, however, in reality, the robots are a little bit offset, one is to the left while the other is to the right of the node. With this assumption, if the robots are instructed to go to the other end of the corridor but to the same location, such an input query may be considered as an impossible input query. The reason for this input query to be considered impossible is that both the robots have to travel via a single lane corridor and reach the same destination, starting from the same source. So, hypothetically, if this query is to be executed, then, the destination node would be exactly the same place, and by the closest distance solution, the starting node will be exactly the same for both the robots. So, the system analyzes the route plans and finds that there are two robots that are symmetrical, both starting from the same location and reaching the same destination with potential collisions. So, the function of the route planner, for these robots would be to find the route that satisfies these conditions with the least number of collisions.

In one embodiment, based on the analysis, the system generates optimal route plans as solutions to address the aforementioned scenario, which may be to allow the first robot to leave the source first for the destination and then, allow the second robot to leave after the first robot moves from the source location. This will lead to the first robot reaching the destination and the second robot trailing behind. This may be considered as the best solution generated by the route planner or the system. But, the challenge is the starting request was symmetrical but the output is asymmetrical, one robot becomes the leading robot while the other robot falls behind. So, in such cases, the system has to identify solutions to address the asymmetry scenario. To resolve this asymmetry scenario, the system analyzes the route plans and randomly picks one robot, and lets that robot go first. In real-time scenarios, this decision taken by the system matters as the robot that was physically behind may be picked to go first. If that is the case, then, this cannot physically happen, as the other robot which is physically present in front can't just flip places as the corridors may not have that much space and may lead to a deadlock situation. So, to resolve such a scenario from occurring, the node resolver module 212 has a critical task. The system takes a decision, based on the analysis, and assigns robots to a start location, mostly, based on the closest distance, but, in some scenarios, there may be a contention that may need to be resolved. If multiple robots are competing for the closest node, then, both robots cannot physically go to the same node, as this may lead to a collision. So, the system optimizes the route plans by instructing one robot to go to another node which is not as close but maybe further away from the start node, and the node resolver has to assign the nodes to the robots in such a way that the movement can be done physically, which means there is no crisscrossing or the robot may be asked to go somewhere else with sufficient space. This assignment of nodes by the node resolver 212 has to be a valid configuration within the operating environment. This task of node resolver can get complicated because the nodes may be redefined with an arbitrary amount of spaces. So, for a feasible solution, if there is a node with a sufficient amount of space (say for ten robots), then, the node resolver can assign multiple robots that may fit into those nodes. However, if there are twenty robots, then the node resolver may have to set those additional robots to different nodes due to space constraints and deadlock issues. After the node is resolved for the robots, the output is the same as the received route requests 203 but discretized. So, now instead of coordinates with the start and end positions, the output of the node resolver module 212 may include nodes that are assigned to the robots.

In one embodiment, the node resolver module 212 may take at least two inputs—graph 202 and route requests 203 on where the robots want to navigate. The system is designed to use multiple approaches for optimization—The system may take the requests for all the robots in one request instance or can take requests of each robot one at a time. By default, unless overridden, the system may take the input as batch requests of routes. The route requests of a robot may be in the form of 2D coordinates (x, y) of a starting point A and a destination point D and may include multiple via points, say, B and C, for example. So, the route request for a robot may indicate that the robot may want to start from point A, then, visit point B, then, C and later reach destination D. These route requests could be input by a web user interface which includes information like current location of the robot, tasks of the robot, etc. The user, for example, a warehouse manager, operator, developer, designer, etc. may select a robot on the web user interface and may instruct the robot to stop all the tasks being performed and request the robot to go to a particular destination. This could be one way of making the robot navigate in the warehouse or autonomously navigating the warehouse. In one embodiment, there may not be manual intervention and the robot is intelligent to decide where they have to navigate.

In one embodiment, for controlling the autonomous behavior of the robot, a separate user interface may be provided where the warehouse operator, as per the application requirement, for example, before the work shift in the warehouse (for example 9 am in the morning slot or 6 pm for the evening slot), may provide a list of tasks, that includes objects to be picked from various aisles or zones in the warehouse and then, dropped to a destination point. This could also be input in any document format, for example, a spreadsheet format (input.xls file), to the system.

In one embodiment, after the node resolver module 212 resolves nodes for the fleet of robots, the output is shared with Multi-Path Tree search (MPTS) module 213. The MPTS module 213 may be involved in analyzing the route plans and optimizing route plans for the fleet of robots. The route plans for the robot include starting from a particular point and moving to a destination point avoiding other robots. The static obstacles are already taken care of at the pre-processing stage by the map generator module 211. The Path search module 214 works in parallel with MPTS module 213 to help generate route plans, analyze the route plans, optimize route plans, or path trajectories 205. For example, the route plans for the first Robot 220 may include a normal path search without considering other robots. As part of the analysis of the route plans, during planning for successive robots, Robot 230 and Robot 240, the path search module 214 compares the trajectory or route plans of the prior robots (e.g., in this case, route plans of Robot 220) and plans for one or more route that avoids the route plans of prior robots while optimizing the travel time to its destination. In FIG. 2 and as described herewith, only 3 robots have been considered for simplicity and for understanding purposes. However, the present invention is not limited to the number of autonomous vehicles and the type of autonomous vehicles. The present invention supports a fleet of heterogeneous autonomous vehicles, for example, autonomous vehicles of different types 171-177 of FIG. 1.

In one embodiment, once the route plans are generated, then, the route plans are registered with a path coordinator 204. The path coordinator 204 includes a central database or a log of route plans and is used to keep track of previously planned routes. The path coordinator 204 may also include computing logic for collision checking and resolving queries related to planned routes. The path search module 214 expands one node at a time. So, when the path search module 214 traverses a path from one node to another node, there are tests involved to check the potential of collisions during the path traversal. So, for these tests, there is a query fired to the path coordinator 204 for every successive robot to check for plans for prior robots. Other modules can also query the path coordinator 204 to do a quick lookup of the route plans. This helps the system to optimize a route plan that may not collide with the previous route plans or can build on top of existing route plans. When another iteration of path search module 214 occurs, the system utilizes the path coordinator 204 to analyze previous paths that have already been planned and then plans for new routes in addition to the existing registered plans. So, the path coordinator 204 includes a data structure that records the history and span of successive paths that are being planned and is also responsible for collision checking with previously planned paths. The path coordinator 204 may include a tree-like hierarchical database of paths and statistics of the paths. It is understood that other representations like stack may also be used. In order to avoid the collision, the system may find the potential collision trajectories planned for the prior robots and avoid them. So, the primary task for a path coordinator 204 is to respond or answer queries, for example, if a robot traverses a path from a source point to a destination point, then, whether there is a possibility of the collision on all trajectories that have been planned along that pathway between the source point and destination point, for prior robots.

In one embodiment, the MPTS module 213 primarily determines the ordering of the path or route plans for the fleet of robots. If there are known trajectories of other robots, then the MPTS module 213 performs an optimization step of determining, at the basic level, which robot may yield to other robots (s) and which robot may have a higher priority value. MPTS module 213 may resolve this by identifying the robot that may be moved first and also, maintain statistics on total travel time, the total number of collisions encountered, etc. The MPTS module 213 utilizes the path coordinator 204 as a storage structure for storing the aforementioned information. In addition, the output of path search module 214 gets appended back to the path coordinator's 204 tree-like hierarchical databases. The system verifies if the ordering of the plan is optimal or not by traversing the tree from the root node to the leaf node, and a single traversal may include a set of paths that gives an estimation of the count of collisions, path time, cost function, etc. The output of the parallel process of Multi-path search module 213 and Path search module 214 is a set of path trajectories 205. The output is like a location and time sequence for every single request, represented in detail herewith. The output, which is a set of trajectories may include additional information like, if the collision is bound to happen, the specific robots that may be involved in a collision, which robot is colliding with the other robot, along with the time when the collision may happen, the route where the collision may occur, expected travel time, other statistical information, etc. For every robot, there is information related to the node and the time sequence. The system may also include some tasks that may be passively converted which is also part of the output information, for example, some robots may not be able to navigate to a particular node where their route plan indicates, but, in order to avoid collisions, the system may force the robots to go somewhere else. Most of the computation happens in the combinatorial tree search of MPTS module 213 and path search module 214, and the problem space expands exponentially with the number of robots.

In one embodiment, the set of path trajectories 205 is passed onto the precondition generation module 215. The primary objective of the precondition generation module 215 is to take the trajectories as the input, remove the time element from them, and extract the order of the path plan. For every region of space, the anticipated visits by the robots are sorted in time. For example, a first robot that is going to visit a specific place later needs to wait until a second robot that visits the place before has moved on and before the first robot can come in. This is an example of chain dependency, wherein the first robot who arrives later has to wait for the one who arrived earlier to depart before the first robot can come in. Here, instead of the timestamps, the precondition generation module 215 utilizes path ordering to solve collision avoidance scenarios.

In real life, robots do not necessarily move as fast as is anticipated. In one embodiment, the precondition generation module 215 absorbs the time-variance by converting the time-stamps in the precondition generation stage. The precondition generation module 215 ensures that the system is relatively robust to disturbances in time-shifting, but the precondition generation module 215 cannot solve some extreme issues like when a robot breaks down and others behind the robot get stalled. The system is generally faced with problems, like, if one robot is stalled indefinitely and if other robots are waiting for the stalled robot, then, all the other robots also get stalled indefinitely. The robot can stop moving for various reasons, like system errors, then, the system then identifies one or more solutions including re-planning the routes, wherein the stalled robot may identify the location as blocked so that other robots can be rerouted away from the blocked location. The flow of precondition generation module 215 can also be explained with an example:—consider a robot 220 which has to navigate to node 1, node 2, and node 3 and there may be a precondition on node 2 that robot 220 cannot go to node 2 until another robot 230 has passed its fifth checkpoint, wherein the fifth checkpoint of robot 230 may be node 2. Based on this analysis, the precondition generation module 215 then generates a precondition output, updating, replanning, or optimizing the route plan that robot 220 may have to wait or cannot go to node 2 unless robot 230 passes beyond node 2.

In one embodiment, after the preconditions are generated by the precondition generation module 215, the preconditions are included in route table 206. The route table 206 is interfaced with the fleet of robots, for example, robots 220, 230, and 240. The route table 206 includes information in the form of continuous coordinates and not real-life discretized nodes. The system converts the discretized nodes into continuous coordinates, leading to start and end nodes getting overwritten. However, the robot's start and destination is already specified in the route request. Once the discretization process is implemented, going into the search, the system analyzes the state of the robots and changes the positions to nodes with the help of node resolver module 212. When the previous routes are analyzed, the system replaces the nodes with positions indicated in original requests, for example, original start and end position real-life coordinates. All the intermediate points may be exactly on the location of the nodes. It doesn't matter which are the intermediate points as long as the start and end positions are identified for analysis.

In one embodiment, once the route table 206 is generated, the individual routes are distributed to all the robots; for example, in FIG. 2, the individual routes may be distributed to the 3 robots—220, 230, and 240. Each robot receives their route and may not need to know the routes of other robots. The route table gets split up and sent to individual robots. There could be any form of communication processes that may be used to send routes to individual robots. One of the examples may be the routes are sent in the form of messages to the robots. Each robot has two modules, the Route sync module, and the local navigation module; for example, Robot 220 has Route sync module 221 and local navigation module 222. The route table 206 gets sent to the component, Route sync 221, a local extension of the route planner or the system, within the Robot 220. The Route sync module 221 runs on the Robot 220 itself and runs as part of a distributed system. Each robot runs a version of the Route sync module on its own vehicle. In one embodiment, there may be limited inputs from the central server coordinating the robots, and the local modules may handle the coordination and navigation. The robots coordinate amongst themselves, synchronize the following of the routes distributed to them. The Route sync module listens to the route progresses of other robots to determine where the robot should go next and how far the robot is allowed to go on its own route in terms of the constraints of the preconditions. Once the determination is made, the Route sync module relays this information to the Local navigation module that the robot should go to the next route point. The robot then starts moving, and simultaneously, the Local navigation module may provide feedback on where the robot thinks the robot is in the navigation space. The positions shared are in real life coordinates, and the coordinates get converted back as the route progresses. So, at a lower level, the Local navigation module keeps track of the current position on the map. In comparison, at a higher level, the system keeps track of where the robot is on the route, for example, whether the robot has passed the first checkpoint or second checkpoint, etc. The process of figuring out the route progress based on the robot's location on the map is done in the Route sync module. The Route sync module's functions are—to listen to other robots' route progress, determine where the robot should go, and relay that information to the Local navigation module to go to the location. Simultaneously, based on the feedback from Local Navigation module, compute its own route progress from the generated optimal route plans and send it to other robots. The other robots have their own Route sync module and Local navigation module, and they perform similar tasks as the first robot.

In one embodiment, the system may be flexible and take feedback from the robot to improve route planning. The two-way instructions from the system to the robot may be in the form of message communication. In real-time scenarios, the environmental conditions of a warehouse may change constantly. If the map was prepared a few days back based on laser scanning of the environment, then there are possibilities that some static objects might have moved, or the robot may come across new obstacles in the present day. In certain circumstances, the system may allow the Route sync module and the local navigation module of each robot to make decisions, like waiting at a particular location, when a new obstacle comes in their pathway. The decisions may be classified into multiple categories: For example, if the obstacle is a human, the robot may wait; however, if the obstacle is an object like a table or box, then the robot knows that those objects are static obstacles and hence may move around the obstacle. In case the obstacle is new information, the obstacle related information is relayed back to the mrrp module. The Route sync module and the local navigation module keeps sending this information back as a feedback loop to the mrrp module or the system to further improve the generation of route plans. Also, route planning is a more conservative process, and hence, during the planning stage, sometimes, the robots may be instructed to avoid movement due to narrow aisles. However, the Route sync module and/or local navigation module may provide feedback; for example, the aisle's width may be wide enough for traveling. Hence, in some cases, the robot can travel a path, which may have been earlier dropped from consideration. The system treats such information as accurate as the information has been obtained locally and indicates the robot's current state, environment, etc. The system takes decisions in such scenarios, considering all factors, and may allow the robot to travel.

At a higher level, the system has to decide when re-planning has to be done; for example, the map's description is sometimes inconsistent with the description in real life. Due to this inconsistency with the warehouse's real-life environment, while planning, there is a possibility that there may be a consideration of sufficient space for the robot to travel; however, in real life, space may not be sufficient for the robot. In such cases, the system dynamically analyzes where certain pathways are blocked and then, optimizes the plan to avoid the situation. So, the system replans the route and considers those blocked pathways as non-traversable. These constraints may be removed at a later time as the condition improves. Such factors may force the system to optimize or re-plan and enable the robot to take an alternative path to reach the destination or avoid a collision. In one embodiment, the system may optimize the routes and the planned routes distributed to the robots are forward-looking. The routes may have been planned considering all possible potential collisions. So, if the robot follows the route plans handed over to them, there won't be any collisions.

In one embodiment, every single node of the tree contains information about the statistics of traversing that node in the tree. Each node of the tree stores the entire trajectory planned for the node. Additionally, along with the path, other information stored on the nodes are statistics related to the trajectory. These trajectories, held in the nodes, are later identified as previously planned trajectories for any new trajectory. The data stored in each node of the tree includes the path, statistics of the path like error codes, total travel time, number of collisions, etc. The data also includes results of value functions that may be specified manually or calculated by the system based on a cost function that includes the number of collisions, passive counts, priority bias, etc. The data may also include visiting counts (visiting counts are used to balance exploration visits.) In case of collisions, the data may include details of collisions like who collided with whom, at what time, at what points in the routes, etc.

In one embodiment, graph 202, for example, a directed graph, may have nodes that have multiple properties. One of the properties of graph 202 is non-parkable nodes. It is understood that the non-parkable nodes may be the critical junctions in the warehouse that the system or route planner may not want to block or clog by traffic. These junctions are used regularly and may slow down the robots' speeds. Such junctions may be indicated as no parking, which suggests that the robots can't wait there or stop there or go there as a destination. Such nodes may be called non-parkable nodes. This property is useful for handling the scenarios wherein multiple robots may clog at critical junctions. This property is then used by the system to instruct the robots, by force, that they should not park or wait or stop at such destinations. The system may ask the robots to move to different nodes, which may not have any system or warehouse related issues, like critical junctions, and maybe parked by the robots. It is understood that the system updates, replans, or optimizes route plans after applying such properties of the graph or for handling complex scenarios encountered navigating in a warehouse.

In one embodiment, the system enables another property of graph 202 related to planning paths for robots without any destination. Such paths are called passive paths, which are paths without any destination. e.g., In such paths, the definition of the end goal is not just a single place, but any location is possible. This passive path property of graph 202 enables the system to allow the robot to take the shortest diversion or movement to avoid a collision. The system may analyze that if a first robot tries to go through a second robot's pathway, the route plan may be optimized to include instructing the second robot to move away from the path to avoid the first robot and allow the first robot to pass through. However, suppose the analysis indicates that no other robots are moving through the second robot's pathway. In that case, the route plan may be optimized to include that the second robot sticks to the original path, and hence, there may not be a need for the second robot to move away from the pathway.

In one embodiment, if a path is passive and there are non-parkable nodes, then the system, in some scenarios, may optimize the route plan to not allow the robots traveling on passive routes to target the non-parkable nodes as the destination. Consider a safety scenario related to fire gates. When the fire alarm sounds, the system automatically closes the fire gates, and all the system components are instructed to stop all tasks and move into an idle state. However, one of the concerns in such critical scenarios may be that a robot may just stop under those fire gates due to the system's instruction to stop. This may lead to blocking the fire gates, and the gates may not be able to close down, which may lead to a fire hazard, which is considered a critical risk. This scenario may also cause damage to the robot. The system analyzes the route plans for the warehouse's critical scenarios and marks the node coinciding with the fire gate as no parking when the robot reaches the non-parking node. The route is then optimized based on the analysis, and instead of stopping, the robot requests a passive route. If the robot is at a parkable node, then the robot halts and stays where they are. However, if the robot is not at a parkable node, then the robot moves to the closest parkable node. The system enables the optimal generation of route plans to handle critical scenarios. The critical scenarios may comprise collisions, fire hazards, clogging the traffic, damages, safety hazards, performance that may impact the productivity, utilization, efficiency of the warehouse, or the robots, etc. In one embodiment, consider a scenario, like One-hour sale, or Prime day sale, or discount day sale, the performance of robots in a warehouse impacts the business. Hence, the performance by the robot during such time periods may be considered as a critical scenario.

The system analyzes the route plans based on graph properties like a passive path and a non-parkable node, in another embodiment. The system may use one of the techniques related to avoiding congestion issues. The system applies heuristics to resolve congestion. The heuristic is to identify nodes in the map where the traffic may be heavy and designate the node as non-parkable. Based on the heuristic analysis, the system may optimize the route plan to not include stopping or waiting at those non-parkable nodes. As the autonomous vehicles converge at the non-parkable nodes, the system updates, replans, or optimizes the route plans with passive paths to take a detour, not stop, or wait at those nodes. The system avoids blocking pathways and takes precautionary measures so that the vehicles do not cause congestion.

In one embodiment, the system analyzes the route plans based on graph properties like non-overlapping nodes. When graphs are designed, the robots have to wait in the nodes. So, the assumption is that the nodes in the graph may not overlap. Every single node has a property defining the amount of space occupied by the node. For example, consider a node's representation as a geometric shape, a circle. It is understood that if there is a robot somewhere in a first node and another robot is at a different place in a second node, then the space occupied by those regions do not overlap. Hence, the nodes are non-overlapping. The system assumes that if a robot reaches a node, then the robot is within the node and not interfering with other robots/humans in other nodes. This is a collision avoiding assumption that makes the tasks of the system simpler. This helps the system be more efficient and avoid scanning the other nodes. The system considers a robot waiting inside a node as not interfering with the other robots moving around it. Hence, that mandates that the nodes may not be overlapping with other nodes in the operating space.

In one embodiment, the output of the map generator module 211 may be in the form of a representation, for example, a graph 202 in which the nodes are not overlapping in space. The system may still try to maximize the nodes' placement such that there is maximum utilization of free space. To draw a fine trajectory, it is necessary for the graph to be detailed spatially and have the nodes placed closer together. This may violate the node spacing assumption, however, the overlapping node property of the graph helps in augmenting this problem. So, each node has a property that specifies details of other nodes overlapping with the said node. So, in collision detection, if multiple robots are in the same segment or node at the same time, and if the sum of their sizes exceeds the space in that node, then, it may be considered a collision. In an overlapping node property, the robot may not just occupy a specific node, but also other nodes that may be overlapping with the specific node. The system analyzes the route plans for various properties and optimizes the routes to avoid collisions in adjacent nodes and other nodes where the robots may be positioned.

In one embodiment, the present invention supports heterogeneous autonomous vehicles, like robots. Consider the below tables for route requests and a sample output of the trajectories, for example, which nodes to traverse, what time, etc. This is like a space and time pair and may happen before the precondition generation step. The trajectories are the raw output of the route planner. Consider that there are two robots A and B with the below input details: It is understood that the node information is provided only for understanding and representation purposes; however, till the node resolver module is not activated, the node information is not available to the system.

TABLE 1

Route requests

| Robot | Position | Time unit | x | y | node (information not available before node resolver module execution) |
|---|---|---|---|---|---|
| A | start | 0 | 90 | 0 | 9 |
| A | end | 0 | 90 | 10 | 19 |
| B | start | 0 | 40 | 0 | 4 |
| B | end | 0 | 40 | 0 | 4 |

In Table 1, the input request includes: the robot A starts at time 0 at (x,y)=(90,0) coordinates which are aligned with node 9 in the warehouse and ends at (x,y)=(90, 10) coordinates, more towards y-direction from the start position, which is aligned with node 19. Similarly, for robot B, the table data indicates that robot B does not want to move from its position, and hence, the (x,y) coordinates (40, 0) are aligned with node 4 for both start and end positions.

TABLE 2

A sample output trajectory is shown below:

| A path time | x | y | node | B path time | x | y | node |
|---|---|---|---|---|---|---|---|
| 0 | 90 | 0 | 9 | 0 | 40 | 0 | 4 |
| 10 | 80 | 0 | 8 | 10 | 30 | 0 | 3 |
| 20 | 70 | 0 | 7 | 20 | 20 | 0 | 2 |
| 30 | 60 | 0 | 6 | 30 | 10 | 0 | 1 |
| 40 | 50 | 0 | 5 | 40 | 0 | 0 | 0 |
| 50 | 40 | 0 | 4 | 50 | 0 | 10 | 10 |
| 60 | 30 | 0 | 3 | 60 | 0 | 20 | 20 |
| 70 | 20 | 0 | 2 | 111 | 0 | 10 | 10 |
| 80 | 10 | 0 | 1 | 121 | 0 | 0 | 0 |
| 90 | 0 | 0 | 0 | 131 | 10 | 0 | 1 |
| 100 | 0 | 10 | 10 | 141 | 20 | 0 | 2 |
| 110 | 10 | 10 | 11 | 151 | 30 | 0 | 3 |
| 120 | 20 | 10 | 12 | 161 | 40 | 0 | 4 |
| 130 | 30 | 10 | 13 | | | | |
| 140 | 40 | 10 | 14 | | | | |
| 150 | 50 | 10 | 15 | | | | |
| 160 | 60 | 10 | 16 | | | | |
| 170 | 70 | 10 | 17 | | | | |
| 180 | 80 | 10 | 18 | | | | |
| 190 | 90 | 10 | 19 | | | | |

Table 2 represents the raw output of route trajectories before the output is shared with the precondition generator module. At time 0, robot A is at node 9, while at time 10, robot A is at node 8, at time 20, the robot moves to the coordinates (70,0) which is aligned with node 7. For representation and simplicity purposes, the path for B is shown after A. Similar to A, the path for B starts at node 4 which is (40,0) at time 0, at time 10, robot B is at node 3 which is (30,0). In Table 2, consider the path of robot A at time 40. At time 40, robot A is at node 5, and at time 50, the robot will be at node 4. However, robot B starts at node 4. So, at time 50, robot B has to move to node 3 in order to avoid collision with robot A which will be at node 4 at time 50. So, as robot A moves from node 5 towards node 4, at that point in time, which is 50 for robot A, robot B starts moving towards node 3 and then node 2, 1, and 0. The system analyzes the paths and identifies potential collision scenarios. The system takes steps and generates the route plan so that robot A does not collide with robot B. Although robot B has to start and end at the same node, as robot A may collide with robot B at node 4, the system instructs robot B to move away from node 4 and take a detour and come back to node 4 at a later point in time. Similarly, robot B is at coordinates (0, 20) at time 60 and at node 20 while robot A is at coordinates (30, 0) at time 60. The system observes that there is no collision at this point, however, based on analysis of the path, the system determines that robot B may end up colliding with robot A if robot B moves to node 10 as robot A will be reaching node A at time 100. So, the system generates a route plan that includes robot B to wait at node 20 till robot A passes node 10 at time 110. As robot A passes node 10 at time 110, robot B then moves from the wait state to the move state and moves to node 10 at time 111. In both the above examples, the system generates a route plan that involves making the autonomous vehicles wait or move to avoid collisions.

In one embodiment, a segment may be represented as a rectangular area or a box format with diagonally opposite points indicated by the x and y coordinates. The segments are diagrammatically represented in FIG. 4(B)-FIG. 4(D). The segment may be represented as an edge in the graph. For example, as shown in Table 2, at time 0 and 10, robot A may be represented with a rectangle in space with coordinates as (90, 0) and (80, 0). The system calculates the volume occupied by the rectangle to identify the space where robot A is at time 0 and 10. This volume of space is represented by the rectangle or box. During the analysis of the path, in order to check for collision, the system may check if the two rectangles or boxes of robot A and robot B intersect or not. If the boxes intersect, then, the path may not be an optimal path as there is a potential collision. Whenever the robot has to move from one node to another node, a query is fired to verify whether the trajectory is colliding or intersecting with previous trajectories. If the response to the query is positive, the robot moves to the next node, else, the system takes a decision of generating the optimal route plan for a robot that may potentially collide with another trajectory. For representation purposes, the collision happens when both robots are at the same node, however, in real-life scenarios, the collision may happen when both robots are in the same segment of space as represented by one of the geometric shapes (box or rectangle or any equivalent shape). It is understood that real-time scenarios in an operating environment are much more complex than shown in the above table, however, the representation is kept simpler for understanding purposes. The chosen example also includes a simple case of ensuring two robots are not at the same node at a particular point time. However, there are various other reasons for which the system may take steps to optimize route plans. While optimizing the routes, the system aims to minimize the collision to the best-effort possible.

It is understood that when an autonomous vehicle moves from one node to another or there is an instruction or a message from the system for the vehicle to either wait, park, take a detour, move, or stop, the system generates a route plan or a trajectory to capture these steps. For representation or simplification purposes, the reference may be only for a vehicle to move or change state, however, in order to implement, the system has to generate one or more route plans which are analyzed for collision and, later, optimal route plans are determined to be later distributed to the vehicles.

In one embodiment, at an implementation level, the graph may be represented by a file that includes a list of numbers that are shown in the sample output trajectory and the route requests represented in the aforementioned tables. The graph may be represented in a system in multiple ways, for example as a jagged array. A jagged array is an array whose elements are arrays. The elements of a jagged array can be of different dimensions and sizes. A 2D jagged array is used to represent the graph. This can be explained in a simplified manner, considering a CSV file. The file is like a table of numbers, the first column is the ID (identifier) of the node, the second column is the x coordinate of the node, the third column is the y coordinate of the node, the fourth column is the size of the node, in terms of the radius. The rest of the columns are a list of edges that exist. Every edge is represented by the ID of the node that the specific node represented by the row may connect to. Also, in each row, the width of the edge is also included.

In one embodiment, the graph generator module 211 provides optimized placement of the nodes such that the amount of free space is maximally used and none of the nodes are overlapping with each other. A graph is then generated which is basically the starting point for the entire operation. This auto-generated graph from the graph generator module does not have any special properties, for example, it has no overlapping nodes nor does it have any parkable nodes, etc. It may have space properties, so, the initial assumption is that the robot is big enough to fit inside one of the corridors, otherwise then, the robots may not be able to move anywhere. In one embodiment, for two robots, consider that the robots are small enough to pass through the corridor and initially, none of the collision avoidance steps need to be considered. Initially, it can be assumed that robots can just walk past each other to initiate the process.

After the graph or map generator module generates graph 202, one or more route requests may be received by the system. As discussed earlier, Table 1 provides an example of a route request. So, Robot A may start at (90,0), and may end at (90, 10). Similarly, Robot B may start at (40, 0) and end at the same point (40, 0). For other robots, a similar start and endpoint with equivalent node details may be provided as part of the route requests. As shown in Table 1, the route requests are in coordinates. These node requests are received at the node resolver module to discretize and assign the correct start node. For example, robot A may start at node 9 and end at node 19, and robot B may start at node 4 and end at node 4. In one embodiment, the route request may not include information related to nodes, and the correct start node assignment is done by the node resolver module. This node assignment task is handled by the node resolver module in multiple ways. One of the methods is using self-organizing maps. A self-organizing map is a type of neural network trained using unsupervised learning to produce a 2D discretized representation of the training samples' input space. In one embodiment, the training samples input space may be called a map.

In one embodiment, instead of using the self-organizing map technique, the node resolver module may use a simpler method of mapping the robot to the closest node. Even if multiple robots may not fit into the same node, the multiple robots are aligned to the nearest node. In collision-related scenarios, the system may postpone the collision resolution to a later stage than handling it at the input stage itself. The system may not consider this as a faulty or invalid input but takes this input and moves to the next step in route planning.

In one embodiment, an additional technique for performing the node resolution step is by upsampling the graph, analogous to the concept of image upsampling technique. In image upsampling, the technique involves obtaining an approximate smooth curve to explain the changes from one pixel to another by applying interpolation techniques between pixels from a low-resolution image to a high-resolution image. Similarly, in the graph, instead of pixels, we have a graph comprising edges and nodes. The upsampling process involves analyzing every single edge, dividing into half, and placing a node in the middle of the edge. This upsampling process leads to automatically doubling edges and increasing nodes. The upsampling process's advantage is that the system gets a high resolution fine-grained topological details of the graph. This process helps the system to determine the closest node more accurately. This closest node may be relatively closer to the actual location information that was initially available. Secondly, since there are more nodes, there is much less likelihood of contention between two robots as there are more nodes, and hence, it becomes easier for node assignment. This process of upsampling of graphs has some factors to be considered. For example, if there is no overlapping of nodes in the graph, then, upsampling of graphs may lead to the overlapping of nodes because multiple nodes are now placed in the same amount of area.

It is understood that for the representations, the term 'node' of a tree is different from the aforementioned 'nodes' of the warehouse. In one embodiment, the nodes of the warehouse are the regions of space where the robots may visit, wait, take a detour, or stop, while the nodes in a tree structure may represent different stages of route planning. In other scenarios, the term 'nodes' may also represent autonomous vehicles that may visit, wait, stop, take a detour, etc. at those nodes. The meaning of the term 'nodes' may be decided based on the context, examples, and scenarios discussed.

Each of the figures, FIG. 3(A)-FIG. 3(E), represent an exemplary non-limiting representation for optimizing route plans, according to an embodiment. In FIG. 3(A), consider each circle as a trajectory. For representation purposes, a data structure, such as a tree, is used in one embodiment. Since the data structure used is a tree, individual entities within the tree may be called nodes. In FIG. 3(A), the circle 301 may be considered a root node, which is the initial state and where no information is initially available. The state information of each node is stored in the path coordinator 204. The structure of the path coordinator 204 is initially empty as the system hasn't started planning, and there are no routes. To start with, the system plans route A which is visually represented by a line or an edge from root 301 to node A. When the system plans a route for route A, the system invokes the Path search module 214. The system's objective is to plan optimal routes compared with the already planned routes, as detailed earlier. The system analyzes the tree and determines no existing planned routes at this stage, so the optimal route is a straight line from the root node to node A. For the route planning step for next node B, there is the existing knowledge of an earlier planned route for A in the path coordinator. During analysis, the system comes across the existing planned route for A. So, for planning routes for B, the system optimizes the route by avoiding the routes already planned in A. This tree structure of the routes planned is stored in the path coordinator 204 and queried by the system to get information on already planned routes as part of the analysis process. After route B is planned, the tree structure within the path coordinator 204 resembles FIG. 3(A) till the construction of node B. Inside each node, starting root node to node B, the information stored in the path coordinator 204 is not restricted to only the paths. In the path coordinator 204, the system also stores information like statistics of the plan, for example—how much time and how long does a route takes, other information like details related to an unavoidable collision, for example, with A, etc. The statistics may also be used to understand how optimal the route is. In one embodiment, the unavoidable collision information may be received from the output of the planning step for specific routes, for example, by a single robot Path search process 214. At a high level, the system can plan the route based on the statistical information, earlier planned routes or trajectories, node information, a destination where the robot would like to go, represented as nodes, etc. This overall information is repeatedly updated in the path coordinator 204. So, the system analyzes the existing route plans at every stage, for example, comparing the routes with previously generated routes. In one embodiment, the system's objective is to analyze based on critical tasks, like collision avoidance, congestion minimization, improving utilization, performance, the efficiency of the robot and/or warehouse, etc., and later, distribute optimal generated route plans to the fleet of robots.

In FIG. 3(A), consider another node C; then, for route planning the above steps may be repeated. During the analysis phase, the system does a collision check. During route planning for node C, the system does a traversal in the backward direction, depicted by arrows 310 and 320, till the earlier planned routes are traversed, ending till the root node. For every earlier planned route (starting from the root node, A, and B), the system makes an entry in a data structure, called a visit table. The path coordinator 204 performs the task of building the visit table. The visit table is a quick lookup table indexed by nodes that allow the system to identify a collision at a particular location. The visit table is like a logbook for every position in the operating environment. Every time a robot passes through a junction or a node or any other location in an operating environment, the visit table is updated with robot information, time, location, collision information-related details, etc. The visit table is updated by all robots that are navigating. Suppose a robot is somewhere in the operating space. In that case, the system allows the robot to query the visit table, which in turn, allows a quick lookup of collision information that is local to where the robot is currently located without performing any extensive traversals of the tree structures. Thus, before route planning, the visit table is updated every time a traversal of ancestor nodes in the tree is done. After route planning for C is completed, the branch or edge connecting route B to route C is obtained. For later route plans, the same process, as discussed above, is repeated, and the visit table is updated accordingly. The system keeps on updating the visit table in the path coordinator 204 as the branch grows for new route plans in the tree. As the path coordinator is itself a tree structure, the system may be further optimized by reusing portions of the visit table that may be analyzed and updated while traversing the ancestor nodes. The optimization involves tracing the lineage of the route planning order to see which is the most recent common ancestor node and use the visit table information from the most recent common ancestor node instead of traversing the entire tree structure. For example, in both FIG. 3(D) and FIG. 3(E), the common ancestor nodes for node A and node D is node C. After traversing node A and while planning for node D, the route planning information available in the visit table may not be revisited again for all nodes, and, instead, the most recent common ancestor node (node C) may only be traversed to optimize by reusing the portions of the visit table, namely node C instead of all other nodes.

In one embodiment, the path coordinator 204 may expand using other techniques also. Every time a route is planned, the data set in the path coordinator 204 and at the granular level, the visit table itself is continuously updated. For example, as shown in FIG. 3(B), unlike FIG. 3(A), consider the system has received a priority input of generating route plans for a robot for route B first before another robot for route A. The plan for B would be the ideal route, as there is no object that may need to be avoided, as represented in FIG. 3(B). It is understood that the objects may include non-human and/or human obstacles that may collide with the robot navigating in an operating environment. After planning B, as shown in FIG. 3(B), the system may plan for A and then may plan for C. FIG. 3(B) represents another form of ordering that may provide another set of statistical information. For example, although C was planned last in both FIG. 3(A) and FIG. 3(B), the ordering of A and B are swapped. There is a possibility that the ordering depicted in FIG. 3(B) may result in a lower count of collisions and travel time as compared to the ordering depicted in FIG. 3(A). It is understood that the system analyzes the various route plans based on multiple parameters, including collision information, reducing travel time, etc., and later optimizes route plans for navigation.

In one embodiment, the analysis of the route plans may identify different ways of ordering the tree to generate better route plans. For example, the branches of the tree may not necessarily need to start from the root. As depicted in FIG. 3(C), the branches may be initiated from intermediate nodes. B may be planned first, and then C may be planned next and, later, plan A. There can be another ordering that may be planned, and this ordering depicted in FIG. 3(C) may be better than the ordering represented in FIG. 3(A) and FIG. 3(B). The advantage of these orderings is that the shared information can also be used, similar to the optimization done for reusing portions of the visit table. For example, in FIG. 3(B) and FIG. 3(C), while optimizing the route planning for node B, all the collected statistical information may be used for the orderings as node B is common to both the orderings. This form of shared information is useful for developing both the orderings. Examples of shared information may include data of common ancestors (for example, node B in FIG. 3(B) and FIG. 3(C)) that may be reused for building the visit table. The non-limiting examples in FIGS. 3(A), 3(B), and 3(C) represent the functioning of path coordinator 204 that builds a tree-like data structure, where every time a path is planned, the path or the trajectory appends to the tree structure. The tree structure expands and later, this tree structure may be used to quickly lookup, both, statistics of the different permutations of orders that were planned and for fast lookups of collision checking.

In one embodiment, the statistics data may be stored in each node of a tree. Every node in a tree stores statistics data, indicating whether the solution is right for the specific node. There are various metrics used for this determination, for example, count of collisions that have been encountered while traversing from parent to the node, number of passive paths, which indicates the number of routes that got converted to no destinations to get to the specific node, total travel time, number of times the system has traversed a path including the node for decision making, etc. This information is critical for the system as during the analysis of route plans, a decision has to be made on whether a child node has to be traversed or not. The system prefers to traverse a node with minimal or zero collision. However, if the statistics data indicates that the node to be traversed has more collisions, this information allows the system to skip the node and look for alternate nodes. Initially, when the system starts to traverse a tree, the system is in uncharted territory. So, the system traverses at a first level; however, after that, the system keeps making decisions and traverses a path that includes one node after another till the child node of the tree is reached. Now, the system has one data point on how good the solution was. Similarly, the system traverses other paths to collect more data points to make accurate decisions on optimizing route plans. Statistics data is one of the sets of information that allows the system to make correct decisions.

In one embodiment, the system uses multithreading during multipath tree search to simultaneously generate different route plans. The search threads are inter-coupled so that if any thread receives any information during a traverse, the data is fed back to the global database 111, which is accessible to other threads for decision making. This global database 111 is synced with other data structures and storage discussed herewith, for example, path coordinator 204. The system allows multiple threads to constantly read the data as long as no one changes the data. Data may be kept constant to avoid any changes; however, during the entire route planning process, some data has to be shared across all threads. However, problems start when a thread may want to write data into the global database, and another thread may try to read the data. So, one of the steps taken by the system to address this problem is to use a tree representation. The solutions in the ancestor nodes are the paths that were traversed before. These solutions are not to be changed as the system is deterministic. So, the data that may be kept constant may be the solutions in the ancestor nodes. The solutions are the computed trajectories, and after computation, there is no need to change them. These solutions are continuously added to the global database 111. However, the data that may have to be modified is the tree statistics data. The statistics data for a particular node may at one stage indicate a good solution; however, another thread may indicate that, after traversing the path related to the node, the statistics data for the node may not be good due to reasons like collisions, travel time, etc. So, the statistics data may have to be modified and may not be kept constant. The values of the statistics data are modified based on information received by different threads at different points in time. So, by this technique, the system ensures that if there is better feedback given by a thread for a particular node, based on their traversal, then the statistics data related to the node has to be updated. This enables more accurate route planning and ensures that the system can optimize the route plans continuously. The system handles the race condition problem by allowing some portions of the tree to be protected (ancestor nodes) while other portions of the tree related to statistics data may be updated.

In one embodiment, the implementation of path coordinator 204 works in unison with the path planning process. The input to path planning is the entire data structure, which is the path coordinator 204, as may be represented by FIG. 3(A), 3(B), and/or 3(C). Note that the representation is simplified for understanding purposes; however, in real-life, the structure is complex, and has various branches depending on the paths to be planned, based on the vast search space of the operating environment, and for navigating multiple heterogeneous autonomous vehicles. The system may receive an input to add a node on top of node C, say D as shown in FIG. 3(D). During the analysis phase, the system then uses the entire data structure for invoking the Path search module 214 to determine ways by which a single robot can avoid all the previously planned paths in the common ancestry. The Multi-path Tree search module 213 is the tree search process for decision making on how to build the tree. The path coordinator 204 itself is the tree. For a Multi-path Tree search module 213, the system applies a smarter technique to explore and get good results without wasting too many computational resources. There are various techniques that can be applied, for example, the traversal is done from the root to the leaf node, and collects statistics of each node in the tree and aggregates statistics for all nodes in the path from the root node to the leaf node in the specific traversed path. For example, in FIG. 3(D), the aggregate statistics may be collected for all nodes from D, C, to B (represented by dotted lines 330) and paths from A, C, to B (represented by dotted lines 340). Next time, after traversing the root node and node C, the Multi-path Tree search module 213 may then analyze whether to traverse the path across node A or node D of FIG. 3(D) depending on previously collected statistics data, which includes collision information, travel time, obstacle information, etc. The system can also add some heuristics to the statistics data to guide the decision to determine the path to traverse, for example, how much was the expected reward of historically traversing a particular path or how much the system wants to explore unknown parameters.

In one embodiment, the present invention improves on existing Tree search techniques. The system automatically determines the ordering that may be planned using a meta-heuristic process. In one embodiment, one of the inputs to the system may be that a particular robot is having a higher priority value and hence, may need to be planned first. In FIG. 3(E), consider the new root node as R, and before entering the tree search module, the system can plan robot X and another high priority robot, say Y. The branches of the node Y are appended to node X and later, to the new root node. This forces the exploration of X first and then, Y. This priority input may be done manually by a user or handled by the system while making decisions related to collision handling. After this, the node Y may be connected to the nodes depicted in FIG. 3(E). This technique ensures that X always has the highest priority value, and then Y has secondary priority, and later, the remaining nodes for exploration. The priority value may also be determined by a softer or less restrictive way, based on analysis done by the system involving biasing the exploration, for example, selecting a node based on the reward of traversing in a particular path instead of any other paths. For example, in FIG. 3(E), the decision to prioritize the left node A or the right node D may depend on the number of times the node has been explored. For example, if node A is explored more number of times than node D, then the prioritization may be based on a node that is explored less, so, in this case, node D may be prioritized. Other parameters that may be used for this decision process can be a preference parameter, where node A may be preferred over node D due to reasons like path traversed with minimal collision. Each parameter may have weighted points, and the sum of the weighted points may be considered for prioritizing a particular node or path. This search heuristic term boosts node B, which helps in biasing the exploration decision towards node B. Various similar mechanisms may be applied to this decision process.

While replanning routes for similar inputs, different solutions may be obtained. The system may be based on a deterministic implementation. In a deterministic implementation, for similar inputs, a similar solution is obtained in one embodiment. However, the reason for obtaining different solutions may be due to multi-threaded implementations while performing tree searching. As the operating system is not real-time, different threads may complete execution at different times. In such scenarios, the statistics of the various nodes in the tree structure may be updated at different rates depending on the load on the system and the processor. As the decision making is based on the statistics of various nodes, when the system analyzes the route plans, the resulting solutions may change based on the load and computations of the system and the processor. In some scenarios, the system may be made more deterministic by allowing the tree searching process to be single-threaded. In other scenarios, for utilizing the system's entire resources, the system may be run multi-threaded. By multi-threaded system, every single node of the tree structure may be expanded to a complete graph search simultaneously that, in turn, requires hefty computational resources and may be executed by multiple threads to give optimal results.

In one embodiment, because of the general non-deterministic nature of the system, the system has the advantage to be flexible and made more deterministic by using the approaches discussed earlier, for example, by ordering biases, which may include preferring route plan D instead of route plan A of FIG. 3(E). So, the next time, even if route plan D is considered, the system may still retain the same bias, and the solutions may be more or less the same in terms of the ordering as the output is the order of the route structure. However, if the event is related to collision avoidance, then the event may be considered a critical process. Due to the bias, if slight changes occur, the system may generate the biased route plans as was being done before a collision. However, during the analysis, the system has no choice but to change the order to avoid a collision, despite the bias. The system also enables critical tasks to take precedence over others. If there is a particular ordering of the tree structure which has to be followed, however, if that may lead to a collision, then the system considers this as a bad or negative approach and takes steps to outweigh the heuristics or other biases. The system then attempts to follow another ordering that may avoid or minimize the collision scenarios.

In one embodiment, the system provides various techniques to avoid collisions, for example, speed scaling. To prevent collisions, the system may take steps to cause the robot to outrun the obstacle coming towards the robot. Here, the obstacle may be a robot, human, or any other moving object for this example. Consider that the obstacle is a second robot. If the route plan for the second robot includes a path that walks right through the first robot, then, even if the system is aware of the path, the first robot may need to be fast enough to ensure that there is no collision with the second robot. In such scenarios, one of the techniques to avoid a collision is to let the robot that travels slowly be planned first and have a higher priority value and the other robot that travels fast can be planned later. Another reason for planning the other robot later maybe the robot's capability to avoid the collision due to the higher speed as compared to the slower robot. In some complex scenarios, other techniques may be applied to prevent collisions. Generally, there are heuristics, like if the system expands a node and if there are undesirable results, such as the solution includes collisions, the system may modify the route plan, based on the analysis, for example, traverse another node of the tree, for better solutions. This means that the system may first generate a route that may lead to a collision. Later, based on the analysis of the routes, the system may update the route plan by moving the robot at a higher speed that has a higher chance of avoiding a collision. The robot's slowing down is taken care of separately by the wait conditions in the Path search module. When the system analyzes a path to avoid collisions, the system updates the route plan by enabling the robot to wait somewhere else to avoid collision with other robots. This process of making the robot wait somewhere else can be considered equivalent to slowing down the robot. In one embodiment, the speed boost technique may be further improved by analyzing the collision that the system is attempting to avoid and then calculating a speed that can be forward projected to confirm that if the robot moves as per the accurately calculated speed, then, the collision may be avoided. The exact speed that can enable the system to prevent collision may also be calculated by the tree search process, where it can be determined the first robot that may lead and go ahead. In contrast, another robot may take backstage and slow down, allowing the first robot to move forward.

In one embodiment, the system provides another technique to avoid a collision that relies on the passive conversion process. Conceptually, it may seem similar to the speed boost technique; however, instead of boosting the speed, in the passive conversion process, the system updates the route plan to change the destination to a different place than the one intended for the robot. Generally, the output of a route plan generation may include statistics data; for example, the estimated travel time may be based on length of the resultant trajectory, count of collisions that exist which may be gathered from past search, count of a number of routes that got denied from the one they were originally destined for, etc. As part of optimization and handling critical processes like collision avoidance, the system may divide the statistics into multiple levels, based on priorities, with the highest priority going to collision avoidance, secondly, reduce passive conversion, which is the number of routes that got denied from the one they were originally destined, and thirdly, reduce the total travel time. Although only three statistics have been discussed, however, the invention may not be limited by these three statistics, and other potential possibilities that arise during the navigation of robots in an operating environment may be considered. The priority value may be customized as per the requirements defined by one or more external entities, like the warehouse manager, or by internal system entities, like route-planner, etc. During this tree search, whenever there is an undesirable number of collisions, then the system may decide to query for a passive route technique. This is the kind of robust decision-making that the system takes to reduce the undesirable number of collisions.

During the life cycle of the route planning process, the system keeps expanding the tree structure. It keeps track of the best solution and/or collisions encountered at every event, including previous route plans. It is understood that the data structure related process steps like tree traversal, expanding nodes in the tree, stopping the search of the tree, adding nodes or branches in a tree are underlying implementations which at a higher level, the system follows for analyzing route plans and optimizing route plans. In one embodiment, the system keeps statistics of the best solutions, for example, which pathway to the leaf node historically gave the best statistics, etc. Whenever the search stops, the system stores the best pathway encountered, which may be based on multiple factors like less travel time, fewer collisions, less path conversion, count of non-overlapping or parkable nodes, a priority value, preference bias, speed, etc. The advantage of this approach is that the system can decide the search's termination based on the parameters mentioned above. One of the search termination conditions may also be defining a threshold for a computational time limit. The threshold may be acceptable if the robot doesn't get stuck during navigation. The system may also accept a threshold that could be defined. The system may permit to have no collisions, 3-4 denied destinations, or 3-4 passive path conversions and returning with the relevant paths meeting the threshold. The system allows different metrics, heuristics, and data to be defined as threshold parameters while analyzing the route plans for critical tasks. Also, in one embodiment, there may be 1-2 robots and a small search space, so one of the criteria could be to explore the entire tree structure before returning with the potential paths as solutions. The system may also allow a user to override the decision making in certain circumstances and cancel the search.

The above tree search techniques are based on using a statistical approach, sampling different techniques, guide further exploration, keeping track of the best solutions found, and when the search terminates, obtaining and returning the best solutions. Besides, the other parameters that may also be returned after the search terminates may be to convert routes to passive routes, change the speed as per the speed boost technique, etc. The system may use all possible permutations and combinations of techniques (as discussed herewith) to define analysis metrics that may be used for determining optimal route plans given a set of generated route plans.

In one embodiment, the system enables customizable time penalty features for making decisions to optimize route planning. Consider a robot that takes a certain amount of time to move from one node to another node. The time may be calculated based on how long the edges are and how fast the robot moves from the start node to the end node. However, in some scenarios, this simple solution may turn out to be complex. The robot may be fat or large in size and hence, takes more time to traverse the corners which may lead to a system imposed time penalty. This penalty may be a customized map based cost function that may be imposed on one or more robots during their navigation. The system may allow such dynamic constraints to be allowed while planning the routes. Another example of a customized map based cost function may be a height restriction parameter, for example, a particular edge may allow for robots under the height of 1 m only, trucks of specific sizes or height only may be allowed to pass through a segment or a node of a graph, robots larger than 2 m may be asked to move slower for a segment. It is understood that there may be other cost functions that may be applied within the scope of this invention. Such constraints may also be used by the system at the planning stage to handle heterogeneous vehicles that may have specific capabilities, behavior, size, etc.

FIG. 3(F) is an exemplary non-limiting representation of a graph illustrating generating optimized route plans between various nodes in an operating environment, according to an embodiment. In one embodiment, the system receives multiple inputs, including a request of one or more robots on where the robot starts, where it ends, the map, ancestors of the previously found routes, etc. Based on the inputs, the system may have to determine the optimal route that simultaneously avoids collisions. Consider a graph data structure, shown in FIG. 3(F) where every node in the graph data structure is a physical node in the map. In the graph data structure, consider a start node and an end node with intermediate nodes. There are multiple paths to reach from the start node to the end node. For example, the paths may start from the start node→node A→end node or start node→node B→node C→end node or start node→node B→node A→end node and other possible combinations to reach from the start node to end node. The arrows indicate the traversal from one node to another node in the route. Let's consider traversal techniques to reach from the start node to the end node. In this technique, the two immediate neighbors of the start node, node A and node B, are considered, and their edge weights may indicate the time a robot may take to traverse from one node to another. For example, the start node to node A may have an edge weight of 1 and the start node to node B may have an edge weight of 2. So, the larger the value of edge weight, this may indicate that the robots take a longer time to traverse from one node to another. So, robots may take longer to reach from start node to node B than to node A, as depicted in FIG. 3(F). The system may also levy travel time penalties for making the robot rotate or turn from their path. For example, if the robot has to take a path from start node→node B→node A, the robot has to take a turn at node B to reach node A, leading to a travel time penalty. In some embodiments, the dynamics of the robot may constrain that the robot may have to slow down before taking a turn, which leads to a time penalty considering that if the robot would have taken a straight path: start node→node A→end node, then, the robot may not need to slow down, and hence, no time penalty may be levied.

In one embodiment, let's consider the edge weight of the entire graph structure as 1. If the route is the start node→node A→end node, then the total edge weight would be the sum of the edge weights taken to traverse the path from the start node to the end node would be 2. Similarly, for the route start node→node B→node A→end node, the total edge weight would be 3. For reaching from the start node to the end node, the shortest path may be start node→node A→end node with a total weight edge of 2, which provides an optimal path in such scenarios. The system always takes the shortest path using the local set of information. However, for other search techniques, other than the edge traversal length, biasing heuristics may also be considered, wherein deciding amongst neighbors of the start node, node A may get a preference because it is closer to the end node. So, this technique enables the system to bias the expansion of the node towards a straight line direction with the shortest path that takes less time to reach from the start node to the end node. These techniques indicate how a typical path search technique finds the shortest path; however, these techniques do not provide any detail related to collision avoidance.

Figure 4A:
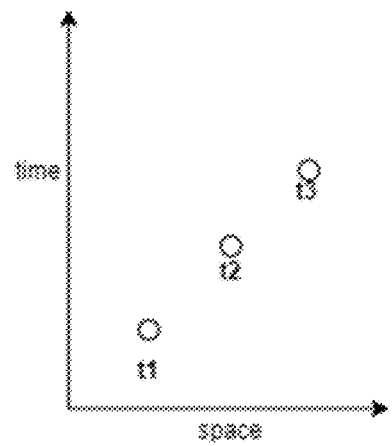
FIGS. 4(A)-4(D), each represent an exemplary non-limiting representation for trajectories in the time and space domain, according to an embodiment.
Figure 4B:
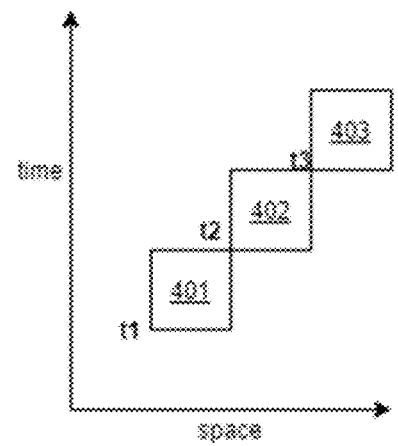

Each of the figures, FIG. 4(A)-FIG. 4(D) is an exemplary non-limiting representation for trajectories in the time and space domain, according to an embodiment. When a node is expanded, the system checks for collisions. For example, consider an edge connecting the start node to the neighbor node A or node B. The system checks whether a robot can travel from the start node to node A or node B as there is a physical connection between the two nodes represented in the graph data structure. In one embodiment, the collision checking may be considered as boundary testing. Consider a 2D graph shown in FIG. 4(A) with Y-axis denoting time and X-axis denoting space. Generally, space is in 2 dimensions; however, for visualization purposes, in FIG. 4, consider space in 1D on the X-axis. For representing discrete trajectories, FIG. 4(A) shows a non-limiting representation with points (t1, t2, t3) as bubbles in time and space. Here, point t1 may be considered the points with x and y coordinates similar to Table 2, as shown earlier. The multiple points, represented by bubbles, shown in FIG. 4(A), indicate how the traversal is done through time and space. To represent the area that one trajectory will occupy, FIG. 4(B) represents multiple boxes. To traverse from point t1 to point t2, the robot has to travel some distance in space and in time. A box 401 is then drawn to represent the traversal, and the box covering point t1 to point t2 denotes the volume in space and time. This process may be repeated for all the connected nodes of the path, and the multiple boxes (e.g., 401, 402, 403) then represents the area one trajectory may occupy, as shown in FIG. 4(B). This information is then shared with other modules of the system based on the data stored in the path coordinator. Now, consider the path from point t1 to point t3 as the path that has been previously planned. In such a scenario, the representation in FIG. 4(B) may indicate that an intersection may not be possible through the 3 boxes 401, 402, and 403. Also, consider that the representation indicates no intersection or conflict with a previously planned trajectory.

Figure 4C:
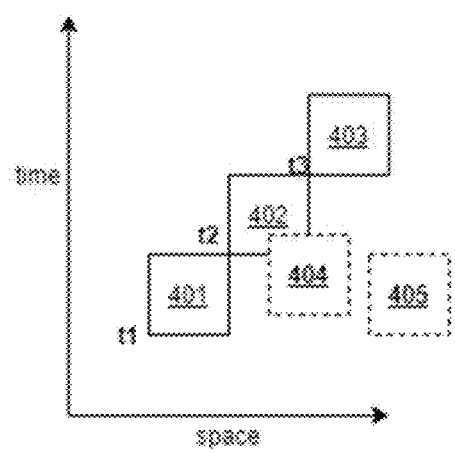
Figure 4D:
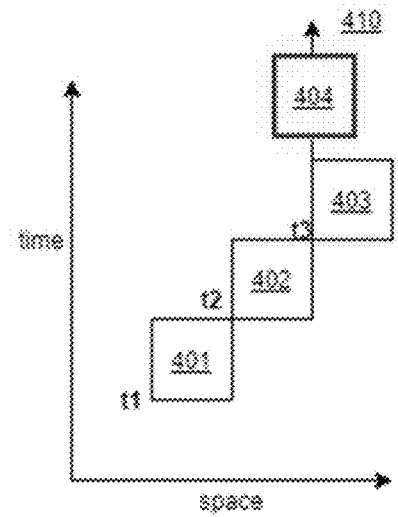

In one embodiment, after the graph representation depicted in FIG. 3(F) is completed, consider a scenario where the system focuses on moving a robot from the start node to another node. This is represented in FIG. 4(C). During planning, consider the robot is moved from the start node to node A (FIG. 3(F)), then, a dotted box is represented in FIG. 4(C). This dotted box, 404, is considered to be the volume occupied by the robot in space and time of the operating environment. The dotted box 404 indicates an intersection with a previously planned or another trajectory; hence, the result is not useful as the route may lead to a collision. However, if the robot moves to another node, B (refer FIG. 3(F)), represented by dotted box 405 of FIG. 4(C), then the system has avoided collision as there is no intersection with previously planned paths or trajectories. The system is now able to make a decision on whether the traversal from the start node to node A at a certain time or start node to node B (FIG. 3(F)) may lead to a collision or not (FIG. 4(C)). Based on this approach, the system can analyze the route plans and determine whether the traversal from a source node to intermediate or destination node A may lead to a collision (example, dotted box 404 of FIG. 4(C).) Hence, the system may attempt traversal to another node B of FIG. 3(F) which may be collision-free (similar to box 405). The above non-limiting scenarios are considered to help understand in a simplified manner the decision taken by the system to find a collision-free path. Also, in some circumstances, as shown in FIG. 3(F) and FIG. 4(C), the system knows that at a particular time, the path from the start node to node A may have an intersection with previously planned paths or other path plans in space and time, this scenario may not be a constant always and may change at a later point in time. At a later point in time, there is a possibility that the new planned paths may not be intersecting with the previously planned paths. This is represented in FIG. 4(D) by an arrow 410, indicating that box 404 (shown with a dark boundary for representation purpose) has slid to a new position in time. By this technique, the system analyzes the route plans and instructs the one or more autonomous vehicles to wait in time, and a path may be planned that may not intersect with the previously planned paths. Also, the movement of box 404 to a new position as depicted by arrow 410 may not necessarily be too far. The system need not move the box 404 to an arbitrary location; instead, the system has to only ensure that the box has to be moved in a different direction, for example, towards the Y-axis in time, in the upwards direction, so that there is no collision with the previously planned or other trajectories. The system calculates the position accurately so that the collision with the previously planned paths can be anticipated so that the box is positioned at that point after the scope for anticipated collision ends. The new route plan includes autonomous vehicles moving to the calculated position and avoiding a collision. By this technique, the system ensures that the planned path is free of any collisions. In one embodiment, the system may also calculate the position accurately and generate a new route plan that may not collide with the previously planned paths or any other generated route plans. The system adapts one or more techniques discussed herein while analyzing the one or more generated route plans for one or more collisions. Based on the analysis, the system optimized one or more route plans. These optimized route plans are later distributed to one or more autonomous vehicles. In one embodiment, the steps performed by the system for analyzing the route plans may be considered as part of the optimization of route plans, and steps performed during the optimization of the route plans may be regarded as part of the analysis of the route plans for critical scenarios.

Figure 5A:
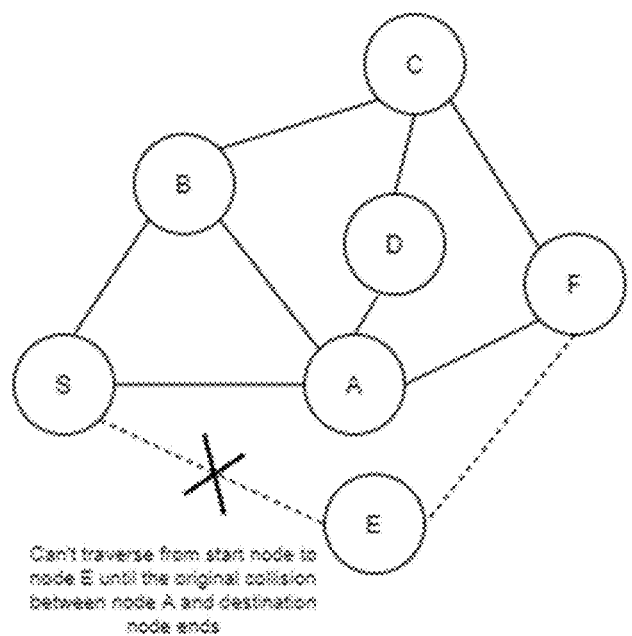
FIGS. 5(A)-5(B), each represent an exemplary non-limiting representation for optimizing route plans, according to an embodiment.
Figure 5B:
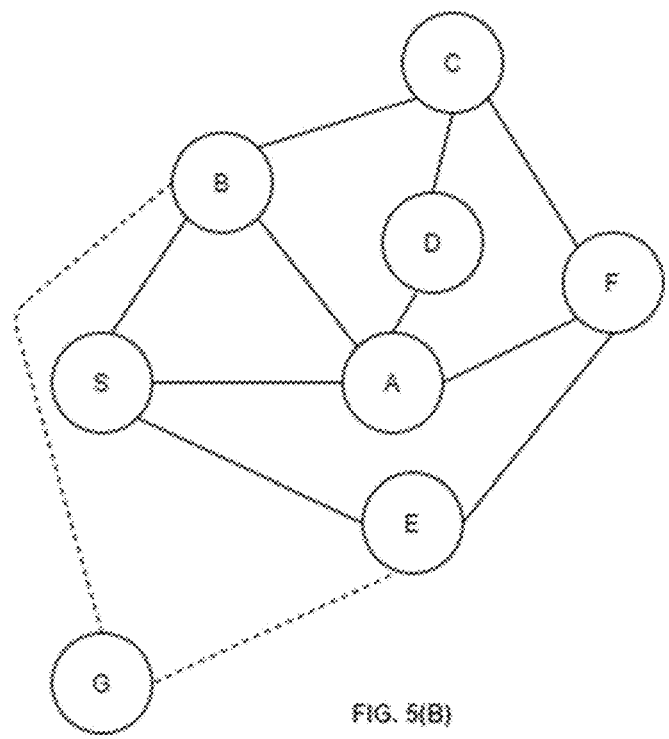

Each of the figures, FIG. 5(A)-FIG. 5(B) is an exemplary non-limiting representation for optimizing route plans, according to an embodiment. Consider FIG. 5(A) as an extension of FIG. 3(F) with collision scenarios, discussed herewith. In one embodiment, when the system analyzes a collision while planning a path from node A to the end node F, the system dynamically modifies the graph, as the search process is also being performed on the graph. For dynamically modifying the graph, the system creates a duplicate node E, which is a copy of the prior node (node A) of one of the colliding nodes (node A and node F). In this case, the prior node is node A for the scenario involving a collision between node A and end node, F, as depicted in FIG. 5(A). As there is a path from node S to the new node E, the system may allow the robot to travel from node S to node E. If the robot travels from node S to the new duplicate node E, the system may force the robot to wait at the new node E until the original collision between node A and node F ends, as a rule. The new node E will have new edges similar to the node A (source node of the colliding nodes A and F), which is an edge from node S to node E and another edge from node E to node F. The new edges are shown in the dotted format for representation purposes. The new node E may now be traversed as an alternative, instead of the blocked node A. The new node E is updated in the graph dynamically, except there is a condition that this new node E may not be traversed (shown by X) until the original collision between node A and node F ends. In some scenarios, the system may not allow traversing from node A to node F due to the collision but may use new node E for traversal instead of node A. However, the system may not allow traversing to new node E from the start node S. Even if the new node E may be reached earlier (for example, if the travel time is short from the node S to new node E), the system still does not allow a path from node E to node F as there is a lower bound on new node E on how earlier the new node E can be traversed. The lower bound may be based on the principle that the new node E may not be traversed until the original collision detected for the path from node A to node F ends. The start node S and the end node F have been shown here for representation purposes, however, this is not limiting, and the technique may be applied for any node in the graph.

Every connected node in a graph gives a possible action to visit or traverse its connected neighboring nodes. In FIG. 5(A), the edge connecting the start node S to the new node E is special because it overlaps in space with node A, but there is a time constraint. The new node E and the original node A correspond to the same location in space (overlaps in space). This overlapping in space can also be understood based on the representations shown in FIG. 4(A)-FIG. 4(D). In FIG. 5(B), traveling from start node S to the blocked node A is not impossible in the true sense; however, the system applies a huge cost penalty due to the intersection with previously planned trajectories (potential collision). The path from start node S to the blocked node A is marked as a high-cost penalty. However, if all the other paths from the start node to other connected nodes are of the same high cost, then the path from start node S to node A may still be considered by the system for traversal. In another scenario, even if the robot has planned to traverse from the start node S to node E and wait till the original collision ends, there is a possibility that after the waiting at node E, the travel from node E to the end node F may lead to another collision (e.g., due to potential change in operating environment circumstances.) If this is the case wherein there is a new collision detected between nodes E and end node F, then the system may decide it is better to take a penalty hit. The system may then decide that the path from start node S to node A and later to end node F may be a better choice in spite of the high cost. So, the system has many possible path options that are explored simultaneously at the same time. At a given time, the system may continuously decide the best possible future options as the system moves further and further away from the starting point S. The system applies this technique iteratively to ensure collision avoidance. These are the underlying implementations that the system utilizes while analyzing the route plans, and later optimizes the route plan based on analysis decisions, like avoiding collisions.

In one embodiment, the system may implement a recursive process for optimal path planning. As shown in FIG. 5(B), consider a scenario where the path between node A and the end node F is blocked. The system may have to take a step back at the previous node, in this case, start node S. From the start node S, node A may be a dead-end, as there is a high cost levied if that route is taken due to the existing collision detected between the node A and end node F. Now, if the system decides to go from start node S to new node E, then, there is a wait time at new node E till the original collision between node A and destination node F ends. Now, suppose there is a collision between start node S and new node E, then a recursive process occurs. The recursive process comprises a duplication process that includes the creation of a duplicate node G, which is a copy of the prior node (start node S) that had a collision with node E. This new node G will have similar edges as the start node S, which means the new node G will have an edge from node G to node E (shown with dotted edges) and another edge to node B (dotted edges), which are neighboring nodes of the start node S. This technique recursively backtraces and tries to identify if the system can satisfy the beginning node, then, the system can plan routes for the later nodes. However, if the system is not able to satisfy the beginning node, then the system may have to go back to planning earlier nodes, which will simultaneously increase the number of options to traverse. To traverse the other nodes, the system has multiple options like moving one level above in the tree and restarting the traversals as discussed herewith, traverse alternate branches to find a better option, etc.

In one embodiment, during a graph search process, it may not be possible to change the previously planned routes. The options available to the system is to move the robot faster or move the robot slower or take a detour to avoid the obstacles. For example, if the obstacle is a person, then they already have a set route. Sometimes, it is possible that after exploring all possible options or scenarios in the graph search, the system may find that one or more collisions may not be avoidable. In such scenarios, the system may force the routes that were planned earlier to be changed to take collision-avoidance steps. This is a kind of higher-level priority search decision taken by the system to override the general scenarios for collision avoidance. For example, the system may direct one or more modules to go higher up in the tree and change the ordering of the trajectories. Whenever a module fails to find a collision-free route even after applying all permutations and combinations of the techniques discussed here, the system gives direction to the Multi-path tree search module to take control. In turn, the Multi-path tree search module may redirect the traversal one level above the current node and asks the trajectory to be planned from that node in the tree first to find collision-free routes.

In one embodiment, the Multi-path tree search module analyzes and makes decisions on the ordering on which route to be planned first. The module can also decide if any reordering needs to be done on whether the route planning has to be changed from one node to another node. The analysis process involves a selection process of the tree search, which is based on the heuristics, which includes a summary of the total collision count, total travel time, total passive conversions, explored and unexplored branches, overlapping nodes, parkable nodes, etc. The analysis process implemented by the Multi-path tree search module leads to optimization of the route planning process with the freedom of changing the ordering of route plans, changing the destinations of some of the routes, changing the speeds of some of the robots as well. The output of the Multi-path tree search module may include ordering of routes to be planned, summary statistics of the planned ordering, a subset of the routes that may have their destinations converted to passive, and a subset of the routes where the robot's speeds were changed. The decision-making is hierarchical wherein, within every single decision, there are graph traversal decisions which basically include queries on whether traversal is possible from one node to another, and the neighboring node to a third node, etc. while satisfying multiple constraints and minimizing the route travel time. The lowest level decision is very basic: whether a robot can traverse from a particular node to another node based on whether the traversal may lead to a collision with previously planned trajectories or other trajectories. Once the basic decision is made, the next decision is to make an optimal choice among the potential options inside one circle or one node of the tree search represented in FIG. 3(A) or FIG. 3(B).

Figure 6:
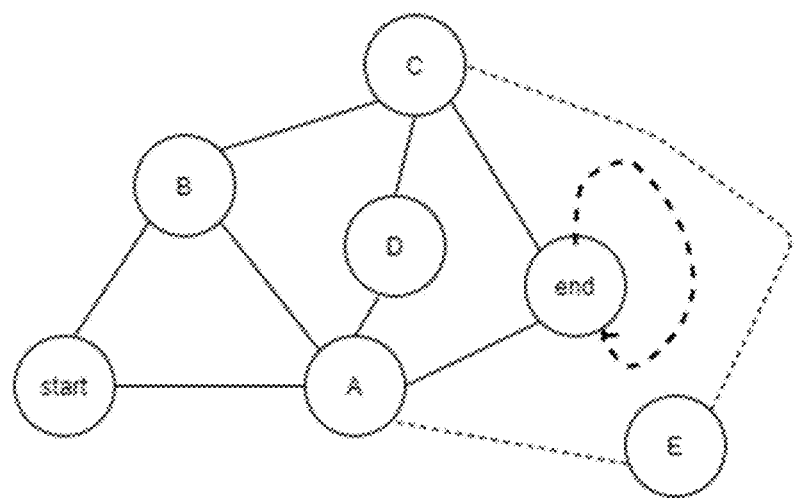
FIG. 6 is an exemplary non-limiting representation for optimizing route plans, according to an embodiment.

FIG. 6 is an exemplary non-limiting representation for optimizing route plans, according to an embodiment. In one embodiment, consider a robot that starts and ends at the same place. This is depicted in FIG. 6 by a dotted arc. Consider a graph as a data structure for this representation. The trajectory may include traveling to multiple nodes and traveling back to the same beginning node. Generally, this scenario is wherein a graph search may not work because of the loop formation back to the start node. The challenge faced by the system is how the search may be terminated because of the loop formation. The system checks whether the robot's current position is equivalent to where the robot is meant to be. If that is the case, then the system stops the search. If the start node and the end node are the same, then the system stops searching as the robot has already reached the destination. The loopback may need to have the same characteristic as a normal path search where the system is simultaneously avoiding collisions. This is achieved by the following technique: Generally, when a robot arrives at a destination, it is expected that the robot should stay there till the end of time or till the next route plan is instructed. For collision checking, the system performs an additional task that includes a space-time collision box. The space-time collision box is defined by a node, wherein the robot stays at the node till the end of time. This is a different type of volume represented in space and time dimensions, as discussed herein.

In one embodiment, the system analyzes the route plans in two ways: Once the robot ends up at an end node, the system makes an additional query, which is a loopback collision check—Can the robot stay there till the end of time? Sometimes, the system gives an affirmative response as there may not be any other robot that may be coming through, and then, the process terminates, and the robot can wait there. In other scenarios, the system gives a negative response that the robot may be there for some time but not till the end of time due to reasons like another robot that may be coming through. In such negative response scenarios, the loopback trajectory (represented by dotted arc) becomes a collision for the robot. One of the mechanisms to resolve this problem is that the system instructs the robot to traverse some other place and later come back, as depicted in FIG. 6. This works essentially by the same mechanism, similar to normal collision avoidance. The system dynamically creates a collision resolving node E and copies all the edges of the end node, and now, the new node E has edges similar to the end node. Similar to collision avoidance techniques discussed herein, the system backtracks one node, for example, node C and analyzes whether it's possible to traverse from node C to the new node E. The new node E also acts as an end node, similar to the original end node. The new end node E has a time constraint, similar to every dynamically generated collision resolving node. The system may not allow traversing the new node E until the original collision ends. Due to the time constraint, there may not be a path from node C to the new node E. In case the travel is not possible, the system recursively backtraces until the collision can be avoided. In case it is possible to travel to node E from node C, then the same process is repeated. The system may invoke a loopback module to check if node E succeeded in avoiding the previous collision of the end node. The system dynamically creates the node E to avoid the collision of the end node as the loopback of node E is at a different time. If the robot can reach node E, which means the time constraint condition was overcome, then the collision at the end node must have ended. Alternatively, this technique may not be able to resolve the collision immediately as there might be another collision (similar to our earlier discussion related to FIG. 5(A) and FIG. 5(B)), in which case, the duplication process will recursively continue. The recursive process continues until the system can resolve the decision making on the robot by reaching the original node from where the robot started the traversal.

In one embodiment, if multiple robots may have to travel to the same destination, then the above technique may not work as multiple robots are competing for the same destination. Such a scenario may lead to two or more collision boundaries that involve the space of the multiple robots intersecting for a large amount of time. In such scenarios, where multiple collision boundaries are leading to a large amount of time, the system ignores the collision avoidance steps and pushes the precondition generator module for a solution. The route trajectories are passed to the precondition generator module, where such collisions are stopped from happening. The module analyzes the route trajectories and creates a deadlock scenario. The deadlock would be at the end destination, wherein the robots may not move forward towards collision but get added to the overall waiting queue. The system takes preemptive measures by planning a deadlock queue for the multiple robots to avoid the collision.

In one embodiment, the system may handle the collision resolving mechanism differently. As discussed above, the collision resolving mechanisms are described as actions which the system handles at a later instant of time; for example, the system may create the new node and asks to come back later at a different timestamp to resolve the problem. Consider two robots starting at the same location, which is basically an unavoidable collision. If the system ignores this condition, then the subsequent ones will also lead to a collision. So, the system takes a decision to space them out at the beginning itself in time. To resolve this, the system scales back the time, for example, in a negative timestamp, and tries to get a head-start. If a head-start is obtained, the system can ensure that the robot quickly gets away from the blocking robot. This helps the system resolve collision issues at the starting point with multiple robots in place. This is similar in idea to the speed boost mechanism discussed earlier, where the robot can quickly move ahead and avoid a collision. However, in the speed boost mechanism, there is no head start possible if the technique is applied to starting positions.

In one embodiment, for collision checking, the input to the system is a trajectory, and the system checks whether the trajectory collides with any other planned trajectories. The implicit assumption is that before the start of the trajectory, where is the robot? e.g., is the robot at the start point, or is waiting at the end node after completing the navigation. This information is relevant for collision checking as the robot's position is required as there may be other robots that may want to travel through the said robot. Sometimes, the system analyzes and decides to do a collision check routine for a portion of the route (starting position or end position, or other portions) instead of the entire route.

In one embodiment, the system generates optimal solutions for inputs that are considered unsolvable; for example, multiple robots starting from the same position or destined to end at the same position is regarded as unsolvable as both start and end position itself leads to a collision. The system aims to minimize the collisions instead of considering the input as faulty or invalid. The system has an absolute collision check mechanism that checks for collisions, and if it is unavoidable, the system optimizes by just ignoring it at the initial stage. Later on, as discussed earlier, the system has a precondition generator module that generates a circular dependency when it encounters a collision in a route. This circular dependency may lead to a deadlock, as discussed herein, instead of an actual collision. The system knows that multiple robots have to run through each other, leading to a collision; however, due to the precondition generator module's circular dependency generation, the multiple robots come close to each other and get stuck there in a deadlock queue instead of colliding with each other. The system then kicks in and attempts to identify the cause and tries to resolve the deadlock scenario, such as moving one of the robots to another location and letting the other robot pass through. This kind of action by the system is handled by the passive conversion module, which moves one of the offending or blocking robots to a different location. These are the different kinds of mechanisms that the system uses based on its analyses. It helps optimize the route plans to be distributed to autonomous vehicles.

In one embodiment, the system may be customized to ensure that any detour, loopback, etc. is done so that the cost is not significantly affecting the route plans. In case there are any potential problems that may be anticipated in the navigation of the robot, for example, a low battery charge, the destination may be defined as a charging point. The system may also introduce intermediate points, such as charging points, instead of defining the points as destination points or drop-off points. The robots may then charge at the via points and later, pick or drop objects at the destination or drop off points. The planned trajectories may be updated as per the system analysis to accommodate various scenarios described herein.

There may be different criteria for the termination in one embodiment, for example, having only one node in the physical space as a destination. For passive routes, any nodes set as parkable may be set for termination as long as the robot can reach the node. Another example may be a given area which can be considered as a termination zone. If any of the robots arrive in the area, then they may be considered as termination. So, the system may apply different termination conditions on any of the nodes.

In one embodiment, the system allows the usage of modes to provide optimal route plans. The modes may be fixed where the routes may be fixed and can't be changed, while other modes may be priority based. Consider a scenario where there is a route that is pre defined and uncontrolled, for example, an external trolley cart that may be pre-programmed to follow a certain route, which may be controlled by an external system, and the system may not be able to control the motion of the trolley cart. The system's trolley cart may be considered a dynamic obstacle and follows certain steps discussed herein to ensure that the robots do not obstruct the trolley cart in its pre-programmed route. For example, the system may cause the robots not to interfere with the trolley cart or wait till the trolley cart moves away on its route, or if the trolley cart does not move away, then the system may cause the robots to move away from the trolley cart and continue on the planned route. At the planning stage, if the pre-programmed routes are input to the system, then the system can plan around the external trolley cart as the system can handle known trajectories, as discussed herein. So, the system decides that since the pre-programmed trajectory can't be changed or interfered with, the system may cause the planned trajectories to avoid the pre-programmed trajectories.

In one embodiment, the search statistics may be designed to be logarithmic, which provides symmetry to the decision-making system. Whenever a node is added to a tree, for example, a priority tree, the system may decide the route that may be planned next. The system may query the statistics data and compare them. The heuristic function for this process is designed in such a way that the perspective is symmetric irrespective of which node is being looked into. This is an optimization technique that makes the system scalable and enables the tree to be invariant to the increasing depth of the tree.

In one embodiment, the system provides a custom function that enables various input sources to be provided to the system. There is some data that is already available to the system. For example, the length of the edges is derived from the graph, geometry of the paths is also derived from the graph, edges may have a speed limit to avoid the devices from moving fast, etc. Every detail on the graph is associated with a graph ID. The custom function may have a graph ID as a parameter to compute the cost. The system may query a database with the graph ID and fetch all properties to derive the cost.

In one embodiment, the system optimizes the route planning based on the robot's capabilities, behavior, or orientation. In an operating environment, for example, a warehouse, some aisles may be small or narrow, and the robot may not be able to turn 180 degrees or more as the robot's structure may be long. So, the system may have to be aware of the robots' properties, such as the robot's orientation, and not just the position of the robots. This additional information may make the tree search process complex. Generally, a node in the graph indicates a position to the system. However, information on one node is not enough. The robot can be there on one node in one position on one orientation. Later, the robot may have a different orientation arriving at the same position. So, arriving at those two different states requires two different build-ups of timelines. The system can handle this complex scenario at the time of execution by not changing the routes but changing the orientation as per the robot's needs, say a forklift. For example, the forklift may have preferences like carrying a palette, then, the forklift should face forward, and if it is not carrying any object, it should face backward. This is more of a safety measure to handle the forklift from causing any damage. While optimizing the route plans, the system may update the route plans so that the forklift has to turn at minimal places in the warehouse, ideally only at corners, where the forklift has to turn anyway. In addition, the system may also cause the forklift to have minimal orientation if the robot goes to an aisle and waits at a node in the aisle and later comes out of the aisle. The system provides additional optimization for orientation during the navigation of the robot. In one embodiment, the system may also change the route when planning for some scenarios; for example, the robot may have to arrive at a node with the opposite orientation. In some scenarios, there may not be a possibility for the robot to do any kind of turns in the path, and the only option that remains is for the robot to take a big detour at a place where there is massive space. Later, the robot may change the orientation and then come back to the destination. The system analyzes the robots' properties and may update the route during the planning stage to cause the robot to arrive at the destination with the opposite orientation.

In one embodiment, the system optimizes the route planning, as discussed herein. When the system is searching in a graph during the path search process, the graph is also modified to leave trails for the system to backtrack later or backtrace. This process is similar to a scratchpad where information is stored to be later recollected, but once the task is finished, the data on the scratchpad is erased. Similarly, while searching, information is stored on each node; however, once the searching is complete, the information is removed. Generally, this is an intensive process to clear all the data before the next search is initiated—the scale of computation and the amount of data that is cached increases exponentially as the graph expands. The system provides an expiry feature wherein instead of erasing all the data, the system leaves the data based on the timestamps. The cached data has a timestamp, and next time, when a search is initiated, the system checks the data and if it is old data, the system may not use the data. So, the expiry feature enables the system to optimize the space and computation to ensure that only selective data is cleared based on the timestamp whenever a new search is initiated.

In one embodiment, as discussed herein, the system optimizes the route planning. During the tree path search, the system searches for one robot at a time. Each robot has a specified radius, and from this information, the system can decide which edges are possible for the robot to travel through, as some edges may be much smaller for the robot to travel. At the planning stage, as part of optimization, the system can consider only those limited edges which are relevant and skip or reject the remaining edges that do not qualify for the robot to travel. This technique enables the system to be more efficient computationally and perform the search with limited parameters. The decision to allow or reject the edges and the route plans may be based on the state of the autonomous vehicle at a higher level. The state may include the size of the robot, its orientation, capabilities, behavior, etc.

In one embodiment, the system may use an arrival radius feature to optimize route plans. The system may invoke the passive route feature with minimal travel time or make the robot stay where they are. The arrival radius feature may be considered as an in-between feature. The destination has a defined radius or set of destinations, and the robot may either reach within the destination radius or any of the set of destinations as part of the route planning. For example, instead of one destination, the system may allow multiple destinations, say 5 destinations. The system now has a flexible option of finding a path to any one of the destinations instead of focusing only on one destination.

Figure 7:
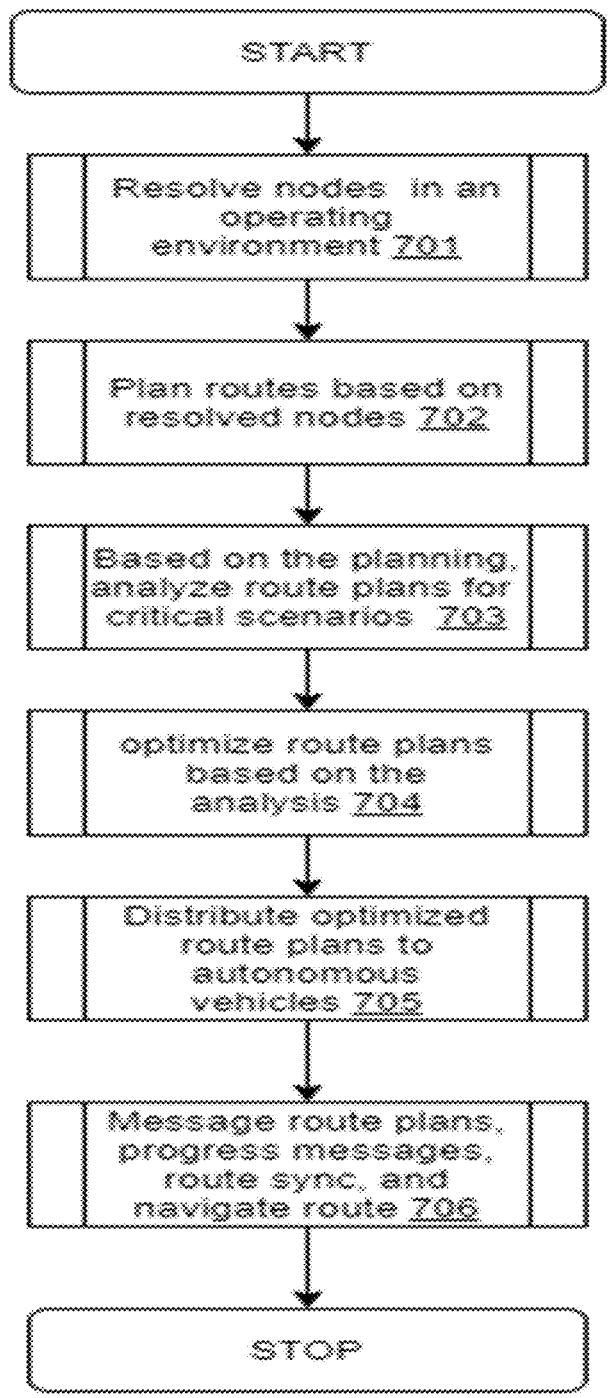
FIG. 7 is an exemplary flow diagram illustrating process steps for optimizing route plans, according to an embodiment.

FIG. 7 is an exemplary flow diagram illustrating process steps for optimizing route plans, according to an embodiment. The system resolves one or more nodes based on one or more inputs related to an operating environment, like a warehouse. The nodes may be considered as regions of space in the operating environment (701). Routes are planned that lead to the generation of route plans based on one or more resolved nodes (702). Based on the planning, the system analyzes generated route plans for one or more critical scenarios, like collision, congestion, safety hazard prevention, damage to the robot, etc. (703). The analysis technique of the system is based on various mechanisms discussed herein. The system optimizes route plans based on the analysis of generated route plans (704). In one embodiment, some of the techniques discussed or implemented for analysis of the route plans may also be utilized for optimization of generated route plans and one or more techniques implemented for optimizing generated route plans may be utilized by the system for analysis to handle critical scenarios. The one or more optimized route plans are then distributed to one or more autonomous vehicles (705). The autonomous vehicles have their own one or more processors and one or more memory where instructions are stored for the processors to execute them. The autonomous vehicles include Route sync and local navigation modules to utilize the optimized route plans for navigation in the operating environment. The modules within the autonomous vehicles may be utilized to message route plans, the progress of the routes, sync route information, and navigation within the operating environment (706).

Figure 8:
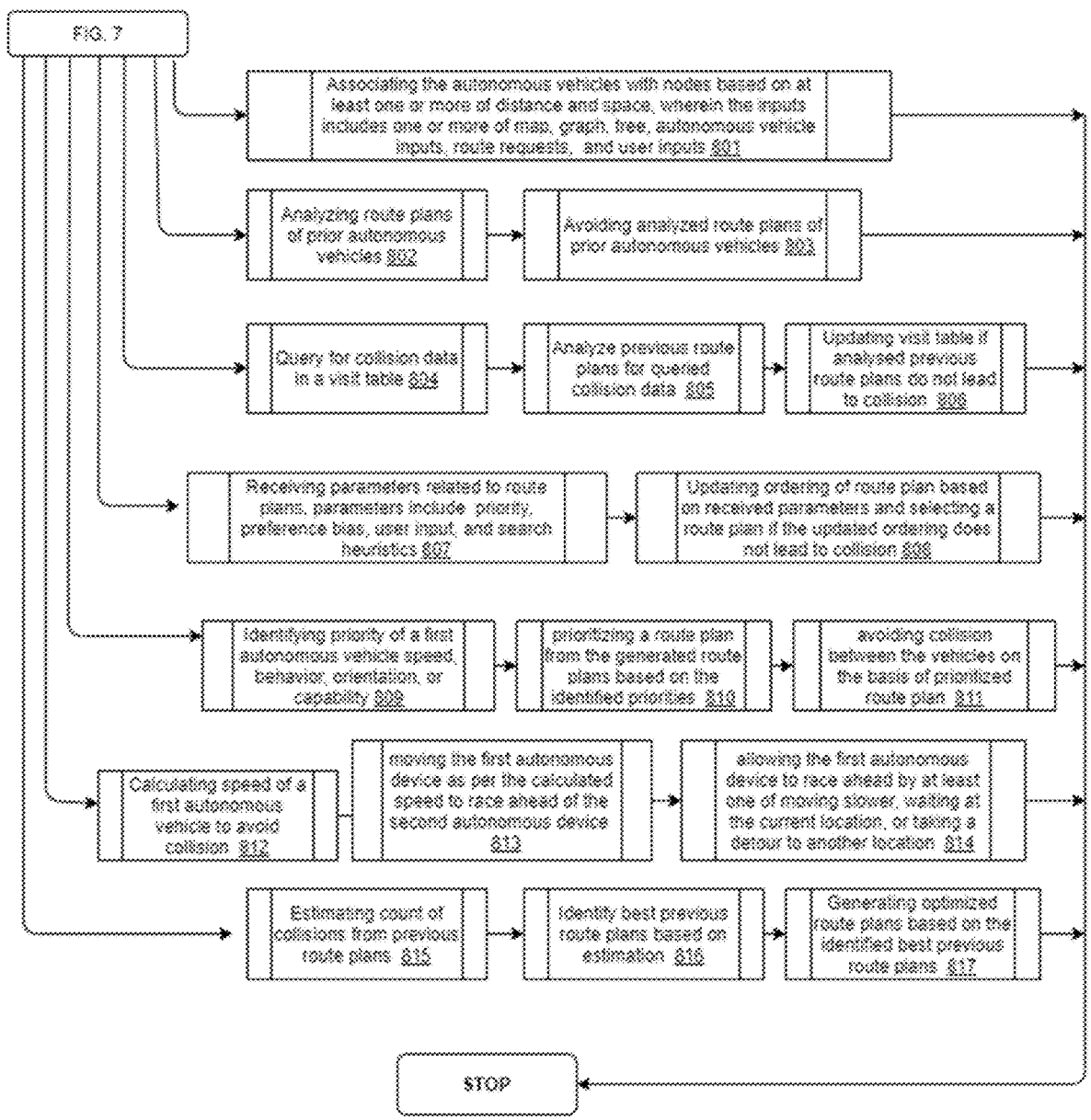
FIG. 8 is an exemplary flow diagram illustrating process steps for optimizing route plans, according to an embodiment.
Figure 9:
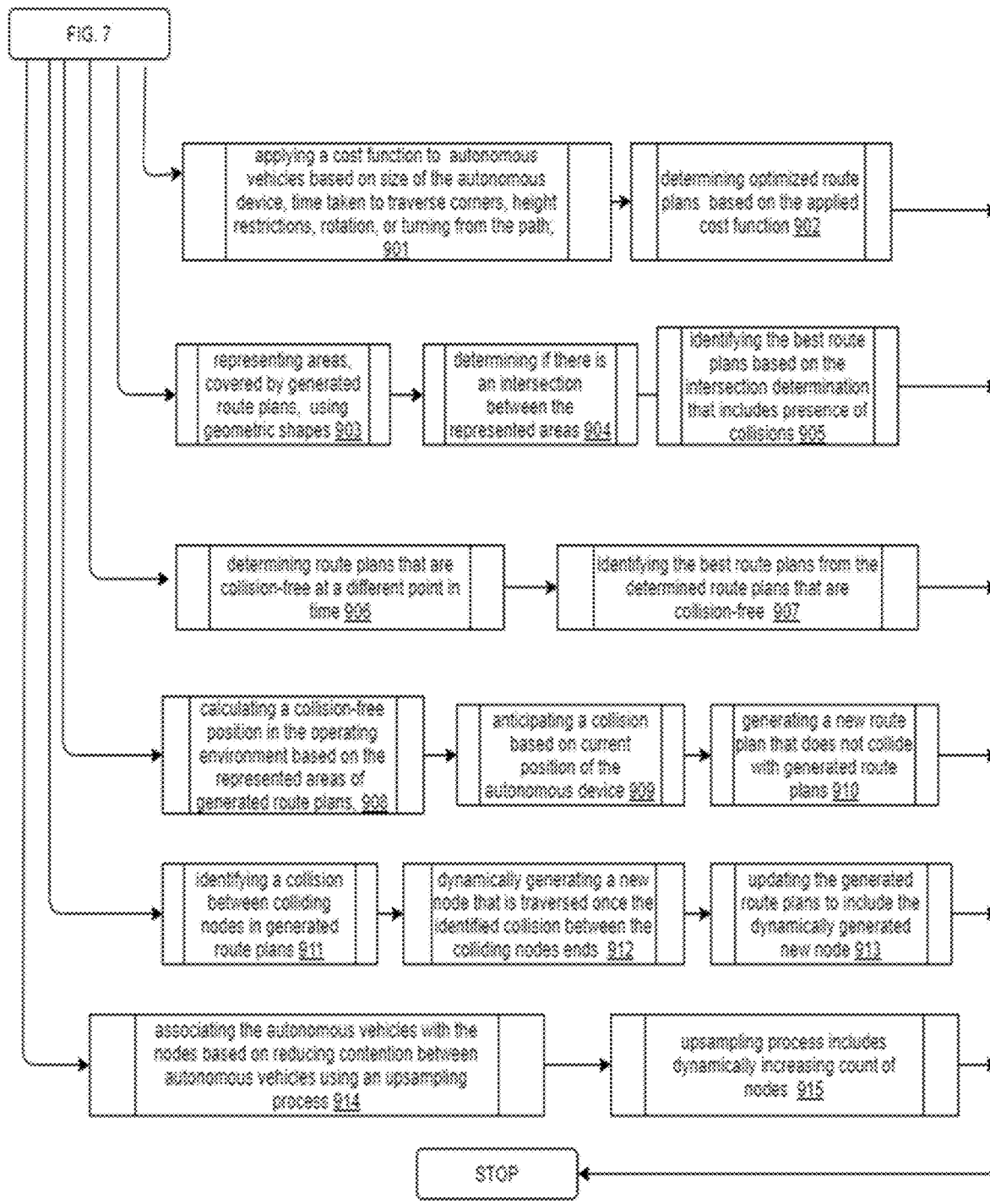
FIG. 9 is an exemplary flow diagram illustrating process steps for optimizing route plans, according to an embodiment.
Figure 10:
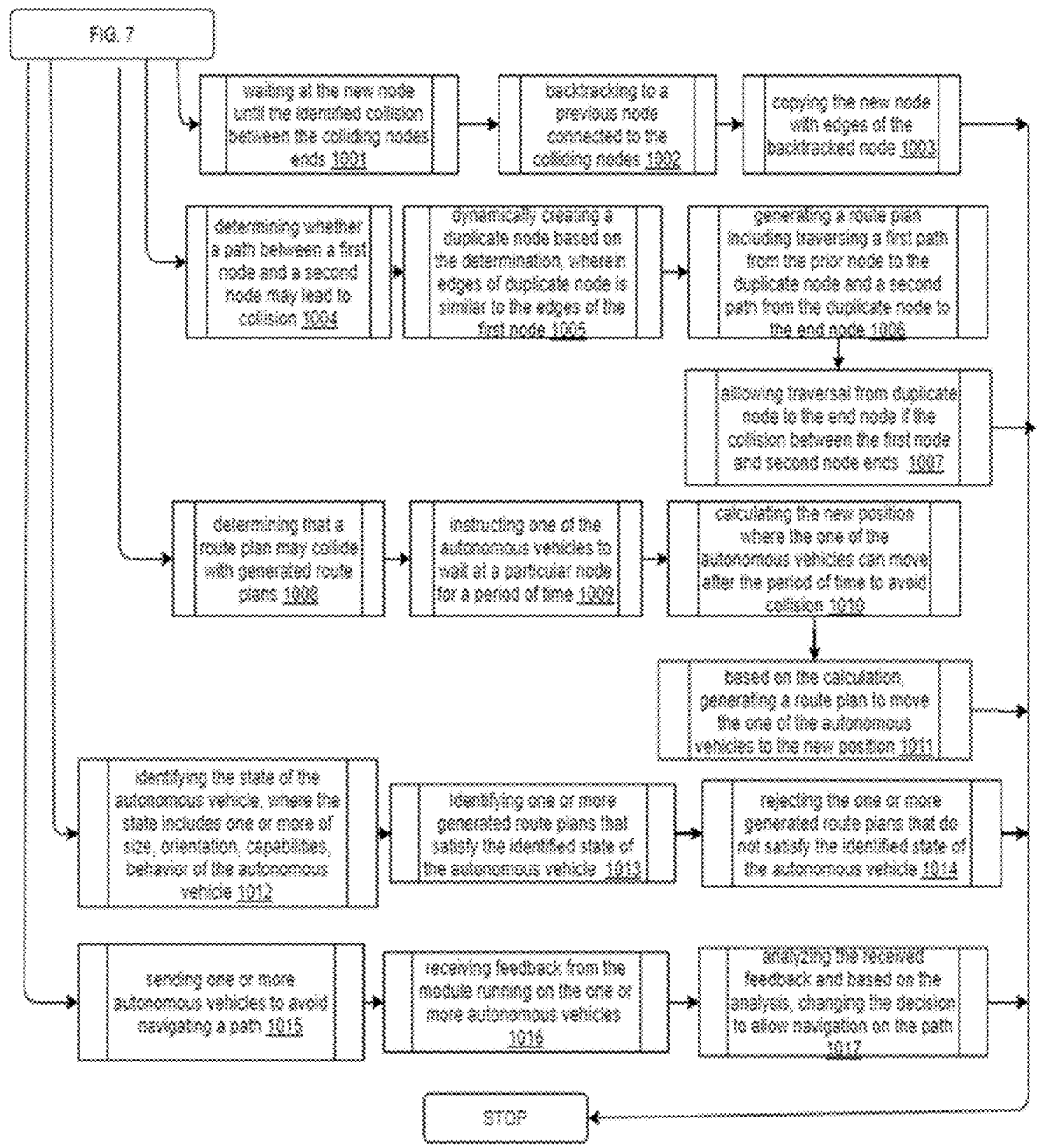
FIG. 10 is an exemplary flow diagram illustrating process steps for optimizing route plans, according to an embodiment.

Each of the figures, FIGS. 8-10 is an exemplary flow diagram illustrating process steps for optimizing route plans, according to an embodiment. FIGS. 8-10 may be represented as an extension of FIG. 7 in one embodiment; however, the process steps included in FIGS. 8-10 may also be considered as separate or combinations of embodiments. The resolved one or more nodes based on one or more inputs related to the operating environment may comprise associating one or more autonomous vehicles with one or more nodes based on at least one or more of distance and speed. One or more inputs may include one or more maps, graphs, trees, autonomous vehicle inputs, route requests, and user inputs (801). The process step of generating one or more route plans based on one or more resolved nodes includes analyzing one or more route plans of one or more prior autonomous vehicles (802). The system avoids analyzing route plans of one or more prior autonomous vehicles. (803).

The system further resolves the one or more nodes based on one or more inputs related to the operating environment by associating the one or more autonomous vehicles with the one or more nodes based on reducing contention between autonomous vehicles using an upsampling process (914). The upsampling process may also include dynamically increasing the count of nodes within the operating environment.

The system may analyze and optimize one or more generated route plans for collision by querying for collision data in a visit table (804). The system may then analyze one or more previous route plans for queried collision data (805). After the previous route plans are analyzed, the system updates the visit table if analyzed and the previous route plans do not lead to collision (806).

The system may optimize one or more route plans based on the analysis that includes receiving parameters related to one or more route plans. The parameters include at least one or more priority values, preference bias, user input, and search heuristics (807). The ordering of route plans is updated based on the received parameters. If the updated ordering does not lead to a collision, the system may update the visit table to reflect the changes (808).

The system may further analyze and optimize one or more generated route plans for collision by identifying the priority value of a first autonomous vehicle based on at least one or more speed, behavior, orientation, or capability of the first autonomous device (809). The route plans are then prioritized from the generated route plans based on the identified priorities of the first autonomous vehicle to provide a prioritized route plan (810). The collision between the first autonomous vehicle and a second autonomous vehicle may be avoided based on a prioritized route plan (811).

The system may avoid collision between the first autonomous vehicle and a second autonomous vehicle based on a prioritized route plan that may include calculating the speed of the first autonomous vehicle to avoid collision (812). The first autonomous device may be moved as per the calculated speed to race ahead of the second autonomous device (813), wherein the second autonomous vehicle may allow the first autonomous vehicle to race ahead by at least one of moving slower, waiting at the current location, or taking a detour to another location (814).

The system may further analyze and optimize one or more generated route plans for one or more collisions by estimating the count of collisions from one or more previous route plans (815). Based on the estimation, the system may identify one or more best previous route plans (816). The system then optimizes one or more generated route plans based on one or more identified best previous route plans (817).

The system identifies one or more best previous route plans based on the estimation that includes one or more of travel time, path conversion, non-overlapping nodes, a priority value, preference bias, speed, and parkable nodes, etc. The system optimizes route plans based on the analysis, including applying a cost function to one or more autonomous vehicles based on one or more of the size of the autonomous vehicle, time taken to traverse corners, height restrictions, rotation, or turning from the path, etc. (901). The system optimizes one or more generated route plans, including making decisions based on the applied cost function (902).

The system optimizes one or more generated route plans based on the analysis that includes representing one or more areas covered by one or more generated route plans, using at least one geometric shape (for example, box, rectangle, etc.) (903). The system determines if there is an intersection between the one or more represented areas. The intersection between the one or more represented areas indicates the presence of one or more collisions between the one or more generated route plans (904). The best route plans may be identified from the one or more generated route plans based on the determination of the intersection between the one or more represented areas (905).

The system optimizes one or more route plans based on the analysis that may include determining one or more generated route plans collision-free at a different point in time (906). The one or more best route plans are identified from the one or more generated route plans based on the one or more determined route plans collision-free (907).

The system analyzes and optimizes the one or more generated route plans for one or more collisions that may include calculating a collision-free position in the operating environment based on the represented areas of one or more generated route plans (908). The collision-free position, which may be calculated includes anticipating a collision based on the current position of the autonomous vehicle (909). A new route plan may be generated based on the calculation, wherein the generated new route plan does not collide with one or more generated route plans (910).

The system further analyzes the one or more generated route plans for one or more collisions, including identifying a collision between colliding nodes in one or more generated route plans (911). The system further dynamically generates a new node, wherein the new node is traversed once the identified collision between the colliding nodes ends (912). The one or more generated route plans may be updated to include the dynamically generated new node (913).

The system may dynamically generate a new node that may include waiting at the new node until the identified collision between the colliding nodes ends (1001). The system then backtracks to a previous node connected to one of the colliding nodes (1002). The system also copies the new node with edges of the backtracked node (1003).

The system analyzes the one or more planned routes (route plans) for one or more collisions, including determining whether a path between a first node and a second node may lead to collision (1004). In one embodiment, the first node is connected to a prior node. Based on the determination, the system dynamically creates a duplicate node, wherein the edges of duplicate nodes are similar to the edges of the first node (1005). The system then generates a route plan that includes traversing a first path from the prior node to the duplicate node and a second path from the duplicate node to the end node (1006) and allowing traversal from the duplicate node to the end node if the collision between the first node and second node ends (1007).

The system further analyzes the one or more route plans for one or more collisions, including determining that a route plan may collide with one or more generated route plans (1008). One of the autonomous vehicles is then instructed to wait at a particular node for a period of time (1009). The new position is calculated where one of the autonomous vehicles can move after a period of time to avoid collision (1010). Based on the calculation, the system generates a route plan to move one of the autonomous vehicles to the new position (1011).

The system may analyze one or more route plans for one or more collisions by including identifying the state of the autonomous vehicle, where the state includes one or more of size, orientation, capabilities, behavior of the autonomous vehicle, etc. (1012). One or more generated route plans may be identified that satisfy the identified state of the autonomous vehicle (1013). The system may reject the one or more generated route plans that do not satisfy the identified state of the autonomous vehicle (1014).

The system analyzes one or more route plans for one or more collisions by including sending one or more autonomous vehicles to avoid navigating a path (1015). Feedback is received from a module running on one or more autonomous vehicles (1016). After analyzing the received feedback and based on the analysis, the system may change the decision to allow navigation on the path (1017).

It is to be understood that the above-described embodiments are merely illustrative of numerous and varied other embodiments which may constitute applications of the principles of the invention. Such other embodiments may be readily devised by those skilled in the art without departing from the spirit or scope of this invention and it is our intent they are deemed within the scope of our invention.

The preceding diagrams represent logical architectures for describing processes according to some embodiments, and actual implementations may include one or more components arranged in other manners. Other topologies may be used in conjunction with other embodiments. Moreover, each component or device described herein may be implemented by any number of devices in communication via any number of other public and/or private networks. Two or more of such computing devices may be located remotely from one another and may communicate with one another via any known manner of network(s) and/or a dedicated connection. Each component or device may comprise any number of hardware and/or software elements suitable to provide the functions described herein as well as any other functions. For example, any computing device used in an implementation of a system according to some embodiments may include a processor to execute program code such that the computing device operates as described herein.

As used in this application, the terms "component", "platform", "module", and "system" are intended to refer to a computer-related entity, either hardware, a combination of software and tangible hardware, software, or software in execution. For example, a component can be, but is not limited to, tangible components such as a processor, chip memory, mass storage devices (e.g., optical drives, solid-state drives, and/or magnetic storage media drives), and computers, and software components such as a process running on a processor, an object, an executable, a data structure (stored in volatile or non-volatile storage media), a module, a thread of execution, and/or a program. By way of illustration, both an application running on a server and the server can be a component. One or more components can reside within a process and/or thread of execution, and a component can be localized on one computer and/or distributed between two or more computers. The word "exemplary" may be used herein to mean serving as an example, instance, or illustration. Any aspect or design described herein as "exemplary" is not necessarily to be construed as preferred or advantageous over other aspects or designs.

The terminology used herein is for the purpose of describing particular aspects only and is not intended to be limiting of the disclosure. As used herein, the singular forms "a", "an" and "the" are intended to include the plural forms as well, unless such exclusion is explicitly stated otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Moreover, unless explicitly stated to the contrary, embodiments "comprising," "including," or "having" (or like terms) an element, which has a particular property or a plurality of elements with a particular property, may include additional such elements that do not have the particular property. Furthermore, references to "an embodiment" of the presently described inventive subject matter are not intended to be interpreted as excluding the existence of additional embodiments that also incorporate the recited features.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application and to enable others of ordinary skill in the art to understand the disclosure with various modifications as are suited to the particular use contemplated.

Various technical advantages of the various embodiments described herein may include optimizing the route plans for autonomous vehicles. Various technical advantages of the various embodiments described herein may include the ability to generate route plans for a complex operating environment with no restriction on the scale of autonomous vehicles navigating the environment. The various embodiments described herein implement steps to avoid collisions or minimize congestion, as an example of the issues arising in an operating environment, using various techniques and data structures. Various technical advantages include the system's ability to handle unsolvable or impossible inputs, prevent deadlock scenarios at critical junctions, plan precautionary measures to avoid safety hazards in the operating environment, etc. while optimizing the route plans. Various technical advantages of the multiple embodiments described herein may also include optimizing space and computation, taking preemptive measures to avoid critical scenarios, etc. Various technical advantages may include the enablement of a robust and flexible cloud platform that utilizes a multi-robot route planner to handle fleets of autonomous vehicles of different types, orientation, capabilities, size, or manufacturers to provide collision-free optimized route plans in a complex operating environment. Other technical advantages include representation of complex real-life scenarios in multiple data structures, reusing existing storage, and efficiently utilizing recently gathered knowledge via robust traversal techniques while optimizing the route plans.

As used herein, the terms "may" and "maybe" indicate a possibility of an occurrence within a set of circumstances; a possession of a specified property, characteristic, or function; and/or qualify another verb by expressing one or more of an ability, capability, or possibility associated with the qualified verb. Accordingly, usage of "may" and "maybe" indicates that a modified term is apparently appropriate, capable, or suitable for an indicated capacity, function, or usage while taking into account that in some circumstances the modified term may sometimes not be appropriate, capable, or suitable. For example, in some circumstances an event or capacity can be expected, while in other circumstances the event or capacity cannot occur—this distinction is captured by the terms "may" and "maybe".

As used herein, terms such as "system," "module," "platform, or "component" may include hardware and/or software that operate(s) to perform one or more functions. For example, a system, module, or controller may include one or more computer processors or other logic-based devices that perform operations based on instructions stored on a tangible and non-transitory computer-readable storage medium(s), such as a computer memory. Alternatively, a system, module, or controller may include hard-wired devices that perform operations based on the hard-wired logic of the device. The systems, modules, components, platform, and controllers shown in the figures may represent the hardware that operates based on software or hardwired instructions, the software that directs hardware to perform the operations, or a combination thereof.

It is to be understood that the subject matter described herein is not limited in its application to the details of construction and the arrangement of elements set forth in the description herein or illustrated in the drawings hereof. The subject matter described herein may be combined or interlinked with one or more embodiments to utilize various techniques or components, and form multiple scenarios or use cases that may not be explicitly described here. The subject matter described herein is capable of other embodiments and of being practiced or of being carried out in various ways.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the presently described subject matter without departing from its scope. The scope of the inventive subject matter should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels and are not intended to impose numerical requirements on their objects. Moreover, unless specifically stated otherwise, any use of the terms "first," "second," "A", "B", "C", or "D", etc., do not denote any order or importance, but rather the terms "first," "second," or "A", "B", "C", "D", etc., may be used to distinguish one element from another. Further, the limitations of the following claims are not written in means-plus-function format and are not intended to be interpreted based on 35 U.S.C. § 112, sixth paragraph, unless and until such claim limitations expressly use the phrase "means for" followed by a statement of function void of further structure.

This written description uses examples to disclose several embodiments of the inventive subject matter, and also to enable one of ordinary skill in the art to practice the embodiments of inventive subject matter, including making and using any devices or systems and performing any incorporated methods. The patentable scope of the inventive subject matter is defined by the claims and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

Embodiments described herein are solely for the purpose of illustration. Those in the art will recognize other embodiments that may be practiced with modifications and alterations to those described above.

The invention claimed is:

1. A computer-implemented method for distributing one or more optimized route plans to one or more autonomous vehicles, the method comprising:
  receiving a graph identifying one or more nodes, wherein the one or more nodes represent regions of free space in an operating environment;
  receiving a request for each of the one or more autonomous vehicles, indicating a start position, one or more intermediate positions, and end position of corresponding one or more autonomous vehicles;
  associating each of the start position and the one or more intermediate positions of each of the one or more autonomous vehicles with a node of the one or more nodes based on the request and the graph;
  planning one or more route plans based on the associated one or more nodes in the operating environment to provide one or more generated route plans;
  based on the planning, analyzing the one or more generated route plans for one or more critical scenarios;
  optimizing the one or more generated route plans based on the analysis to provide the one or more optimized route plans, wherein optimizing further comprising:
    representing one or more areas, covered by the one or more generated route plans, by at least one or more geometric shapes;
    determining if there is an intersection between the represented one or more areas, wherein the intersection between the represented one or more areas indicates presence of one or more collisions between the one or more generated route plans; and
    performing one of, identifying one or more best route plans from the one or more generated route plans and generating one or more new route plans, by anticipating a collision with the one or more generated route plans based on the at least one or more geometric shapes, upon the determination of the intersection between the represented one or more areas; and
  distributing the one or more optimized route plans to the one or more autonomous vehicles, for optimized movement of the one or more autonomous vehicles in the operating environment.

2. The computer-implemented method of claim 1, further comprising: wherein analyzing the one or more generated route plans for the one or more critical scenarios to identify a priority value of a first autonomous vehicle based on at least one or more of speed, behavior, orientation, or capability of the first autonomous vehicle;

prioritizing planning of a route plan for the first autonomous vehicle from the one or more generated route plans based on the identified priority value of the first autonomous vehicle to provide a prioritized route plan for the first autonomous vehicle; and avoiding the one or more critical scenarios between the first autonomous vehicle and a second autonomous vehicle on the basis of the prioritized route plan, wherein the one or more critical scenarios include one or more of collision avoidance, or at least related to performance of vehicles or warehouse.

3. The computer-implemented method of claim 2, wherein avoiding the one or more critical scenarios between the first autonomous vehicle and the second autonomous vehicle on the basis of the prioritized route plan comprises:

calculating the speed of the first autonomous vehicle to avoid a collision; and moving the first autonomous vehicle as per the calculated speed to race ahead of the second autonomous vehicle, wherein the second autonomous vehicle allows the first autonomous vehicle to race ahead by one of, moving slower and taking a detour to another location.

4. The computer-implemented method of claim 1, wherein optimizing the one or more generated route plans based on the analysis further comprising:

determining the one or more generated route plans that are collision-free at a different point in time; and identifying one or more best route plans from the one or more generated route plans based on the determined one or more generated route plans that are collision-free.

5. The computer-implemented method of claim 1, wherein optimizing the one or more generated route plans further comprising:

calculating a collision-free position in the operating environment based on represented one or more areas of the one or more generated route plans, wherein calculating the collision-free position includes anticipating a collision based on a current position of the autonomous vehicle; and generating a new route plan based on the calculation, wherein the generated new route plan does not collide with one or more planned route plans.

6. The computer-implemented method of claim 1, wherein optimizing the one or more generated route plans further comprising:

identifying a collision in a path between two colliding nodes in the one or more generated route plans;

generating a new node based on the identified collision, wherein the new node is traversed once the identified collision in the path between the two nodes ends; and updating the one or more generated route plans to include the generated new node.

7. The computer-implemented method of claim 1, wherein optimizing the one or more generated route plans further comprising:

determining whether a path between a first node and a second node may lead to a collision, wherein the first node is connected to a prior node;

based on the determination, creating a duplicate node, which is a copy of the prior node;

generating a route plan including traversing a first path from the prior node to the duplicate node and a second path from the duplicate node to an end node; and allowing traversal from the duplicate node to the end node if the collision between the first node and second node ends.

8. The computer-implemented method of claim 1, wherein optimizing the one or more generated route plans further comprising:

determining that a route plan may collide with the one or more generated route plans;

based on the determination, instructing one of the one or more autonomous vehicles to wait at a particular node for a period of time;

calculating a new position where the one of the one or more autonomous vehicles can move after the period of time to avoid a collision; and based on the calculation, updating the route plan to move the one of the one or more autonomous vehicles to the new position.

9. The computer-implemented method of claim 1, wherein analyzing the one or more generated route plans comprising:

determining whether the one or more generated route plans include one or more non-parkable nodes.

10. A computer system comprising:

an operating environment, comprising one or more autonomous vehicles; and a platform comprising: one or more processors; and one or more computer-readable storage media having stored thereon computer-executable instructions that, when executed by the one or more processors, cause the computer system to perform a method for optimizing one or more route plans for the one or more autonomous vehicles, the method comprising the following:

receiving a graph identifying one or more nodes, wherein the one or more nodes represent regions of free space in the operating environment;

receiving a request for each of the one or more autonomous vehicles, indicating a start position, one or more intermediate positions, and end position of corresponding one or more autonomous vehicles;

associating each of the start position and the one or more intermediate positions of each of the one or more autonomous vehicles with a node of the one or more nodes based on the request and the graph;

planning the one or more route plans based on the associated one or more nodes in the operating environment to provide one or more generated route plans;

based on the planning, analyzing the one or more generated route plans for one or more critical scenarios;

optimizing the one or more generated route plans based on the analysis to provide the one or more optimized route plans, wherein optimizing further comprising:

representing one or more areas, covered by the one or more generated route plans, by at least one or more geometric shapes;

determining if there is an intersection between the represented one or more areas, wherein the intersection between the represented one or more areas indicates presence of one or more collisions between the one or more generated route plans; and performing one of, identifying one or more best route plans from the one or more generated route plans and generating one or more new route plans, by anticipating a collision with the one or more generated route plans based on the at least one or more geometric shapes, upon the determination of the intersection between the represented one or more areas; and distributing the one or more optimized route plans to the one or more autonomous vehicles, for optimized movement of the one or more autonomous vehicles in the operating environment.

11. The computer system of claim 10, further comprising analyzing the one or more generated route plans for the one or more critical scenarios to identify a priority value of a first autonomous vehicle based on at least one or more of speed, behavior, orientation, or capability of the first autonomous vehicle;

prioritizing planning of a route plan for the first autonomous vehicle from the one or more generated route plans based on the identified priority value of the first autonomous vehicle to provide a prioritized route plan for the first autonomous vehicle; and avoiding the one or more critical scenarios between the first autonomous vehicle and a second autonomous vehicle on the basis of the prioritized route plan, wherein the one or more critical scenarios include one or more of collision avoidance, or at least related to performance of vehicles or warehouse.

12. The computer system of claim 10, wherein optimizing the one or more generated route plans based on the analysis further comprising:

determining the one or more generated route plans that are collision-free at a different point in time; and identifying one or more best route plans from the one or more generated route plans based on the determined one or more generated route plans that are collision-free.

13. The computer system of claim 10, wherein optimizing the one or more generated route plans further comprising:

calculating a collision-free position in the operating environment based on represented one or more areas of the one or more generated route plans, wherein calculating the collision-free position includes anticipating a collision based on a current position of the autonomous vehicle; and generating a new route plan based on the calculation, wherein the generated new route plan does not collide with one or more planned route plans.

14. The computer system of claim 10, wherein optimizing the one or more generated route plans further comprising:

identifying a collision in a path between two nodes in the one or more generated route plans;

generating a new node based on the identified collision, wherein the new node is traversed once the identified collision in the path between the two nodes ends; and updating the one or more generated route plans to include the generated new node.

15. The computer system of claim 14, wherein dynamically generating the new node comprising:

waiting at the new node until the identified collision between the colliding nodes ends;

backtracking to a previous node connected to one of the colliding nodes; and copying the new node with edges of backtracked node.

16. The computer system of claim 10, wherein optimizing the one or more generated route plans further comprising:

determining whether a path between a first node and a second node may lead to a collision, wherein the first node is connected to a prior node;

based on the determination, creating a duplicate node, which is a copy of the prior node;

generating a route plan including traversing a first path from the prior node to the duplicate node and a second path from the duplicate node to an end node; and allowing traversal from the duplicate node to the end node if the collision between the first node and second node ends.

17. The computer system of claim 10, wherein optimizing the one or more generated route plans further comprising:

determining that a route plan may collide with the one or more generated route plans;

instructing one of the one or more autonomous vehicles to wait at a particular node for a period of time;

calculating a new position where the one of the one or more autonomous vehicles can move after the period of time to avoid a collision; and based on the calculation, generating the route plan to move the one of the one or more autonomous vehicles to the new position.

18. The computer system of claim 10, wherein analyzing the one or more generated route plans comprising:

determining whether the one or more generated route plans include one or more non-parkable nodes.

19. A non-transitory computer-readable medium having stored thereon instructions for causing one or more processors to perform a method for distributing one or more optimized route plans, the method comprising:

receiving a graph identifying one or more nodes, wherein the one or more nodes represent regions of free space in an operating environment;

receiving a request for each of one or more autonomous vehicles, indicating a start position, one or more intermediate positions, and end position of corresponding one or more autonomous vehicles;

associating each of the start position and the one or more intermediate positions of each of the one or more autonomous vehicles with a node of the one or more nodes based on the request and the graph;

planning one or more route plans based on the associated one or more nodes to provide one or more generated route plans;

based on the planning, analyzing the one or more generated route plans for one or more critical scenarios;

optimizing the one or more generated route plans based on the analysis to provide the one or more optimized route plans, wherein optimizing further comprising:

representing, one or more areas, covered by the one or more generated route plans, by at least one or more geometric shapes;

determining if there is an intersection between the represented one or more areas, wherein the intersection between the represented one or more areas indicates presence of one or more collisions between the one or more generated route plans; and performing one of, identifying one or more best route plans from the one or more generated route plans and generating one or more new route plans, by anticipating a collision with the one or more generated route plans based on the at least one or more geometric shapes, upon the determination of the intersection between the represented one or more areas; and distributing the one or more optimized route plans to the one or more autonomous vehicles for optimized movement of the one or more autonomous vehicles in the operating environment.

20. The non-transitory computer-readable medium of claim 19, wherein analyzing the one or more generated route plans comprising:
   determining whether the one or more generated route plans include one or more non-parkable nodes.

* * * * *